(12) United States Patent
Kawashima et al.

(10) Patent No.: US 7,091,641 B2
(45) Date of Patent: Aug. 15, 2006

(54) MAGNETIC BEARING DEVICE AND TURBO MOLECULAR PUMP WITH THE MAGNETIC BEARING DEVICE MOUNTED THERETO

(75) Inventors: Toshiaki Kawashima, Narashino (JP); Masayuki Yamamoto, Narashino (JP)

(73) Assignee: Boc Edwards Japan Limited, (JP)

( * ) Notice: Subject to any disclaimer, the term of this patent is extended or adjusted under 35 U.S.C. 154(b) by 316 days.

(21) Appl. No.: 10/803,775

(22) Filed: Mar. 18, 2004

(65) Prior Publication Data
US 2004/0183509 A1 Sep. 23, 2004

(30) Foreign Application Priority Data
Mar. 19, 2003 (JP) ............... 2003-075308

(51) Int. Cl.
H02K 7/09 (2006.01)
H01F 17/00 (2006.01)
G05B 5/01 (2006.01)

(52) U.S. Cl. .................................... 310/90.5
(58) Field of Classification Search ............... 323/265, 323/266, 268, 271, 355, 362; 310/90, 90.5; 318/610, 623, 638, 653
See application file for complete search history.

(56) References Cited
U.S. PATENT DOCUMENTS 3,823,990 A 7/1974 Gillinson, Jr. ............... 308/10
5,973,468 A * 10/1999 Yamauchi ................... 318/610
6,005,316 A 12/1999 Harris ........................ 310/90.5
6,259,179 B1 * 7/2001 Fukuyama et al. ........ 310/90.5
6,278,251 B1 8/2001 Schöb ........................ 318/293
6,297,574 B1 10/2001 Schöb et al. ............... 310/90.5
6,873,075 B1 * 3/2005 Taira et al. ................ 310/90.5
6,949,853 B1 * 9/2005 Kawashima ............... 310/90.5

FOREIGN PATENT DOCUMENTS

EP 0395116 4/1990

* cited by examiner

Primary Examiner—Matthew V. Nguyen
(74) Attorney, Agent, or Firm—Adams & Wilks

(57) ABSTRACT

To provide a magnetic bearing device capable of lowering the costs required for the manufacture, installation, or the like of a turbo molecular pump by reducing the number of elements of an amplifier circuit that drives, through excitation, electromagnets as well as the number of wires of a cable that connects the each electromagnet and the amplifier circuit to each other, and a turbo molecular pump with the magnetic bearing device mounted thereto. One end of an electromagnet coil is connected to a common node. Also, the other end thereof is connected to an amplifier circuit composed of one transistor and one diode. Further, the one end of the electromagnet coil is common with respect to each of the electromagnets, and the common node R is controlled by an intermediate-voltage maintaining circuit so as to maintain an intermediate voltage.

34 Claims, 17 Drawing Sheets

FIG. 5
WHEN
ACTUAL VOLTAGE VALUE OF COMMON NODE R IS CONSIDERABLY
LOWER THAN VOLTAGE COMMAND VALUE MAKING THE VOLTAGE ERROR LARGE
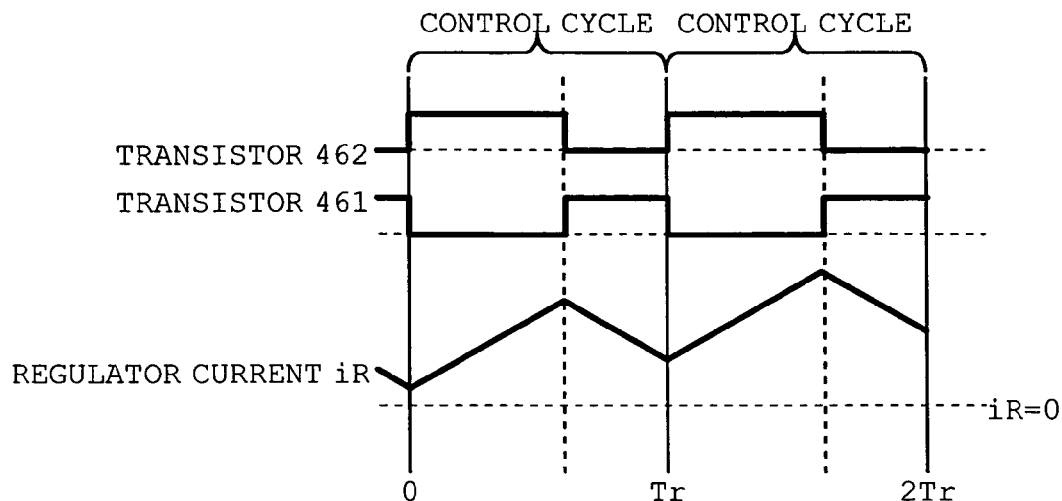
WHEN
ACTUAL VOLTAGE VALUE OF COMMON NODE R IS SLIGHTLY
LOWER THAN VOLTAGE COMMAND VALUE MAKING THE VOLTAGE ERROR SMALL
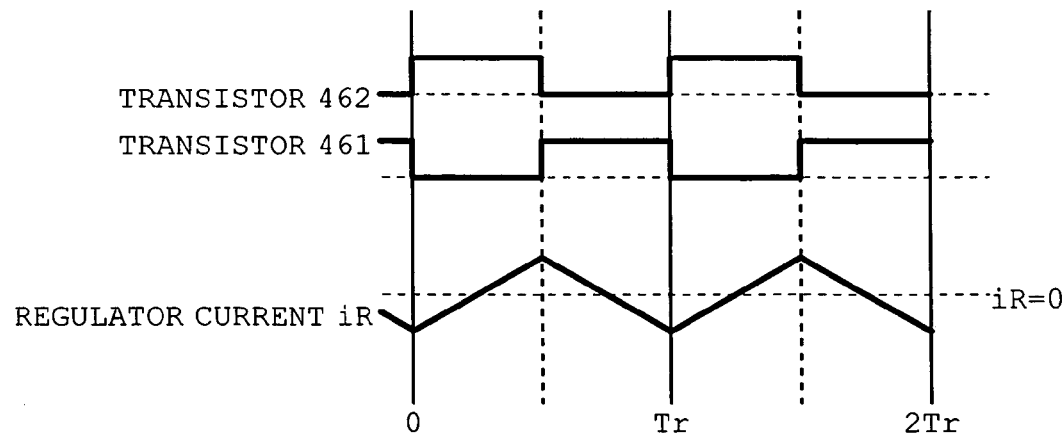

FIG. 7
WHEN
ACTUAL VOLTAGE VALUE OF COMMON NODE R IS CONSIDERABLY
HIGHER THAN VOLTAGE COMMAND VALUE MAKING THE VOLTAGE ERROR LARGE
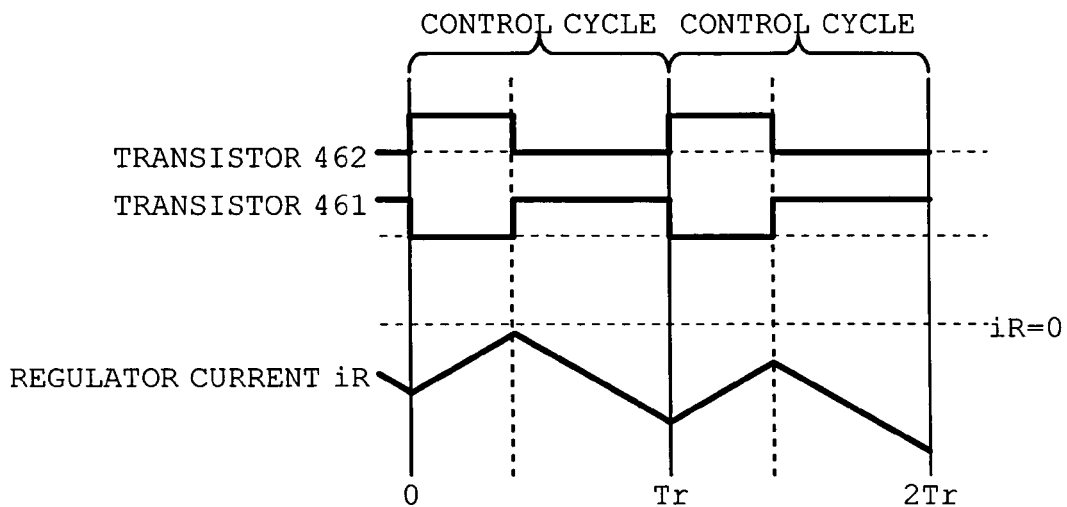
WHEN
ACTUAL VOLTAGE VALUE OF COMMON NODE R IS SLIGHTLY
HIGHER THAN VOLTAGE COMMAND VALUE MAKING THE VOLTAGE ERROR SMALL
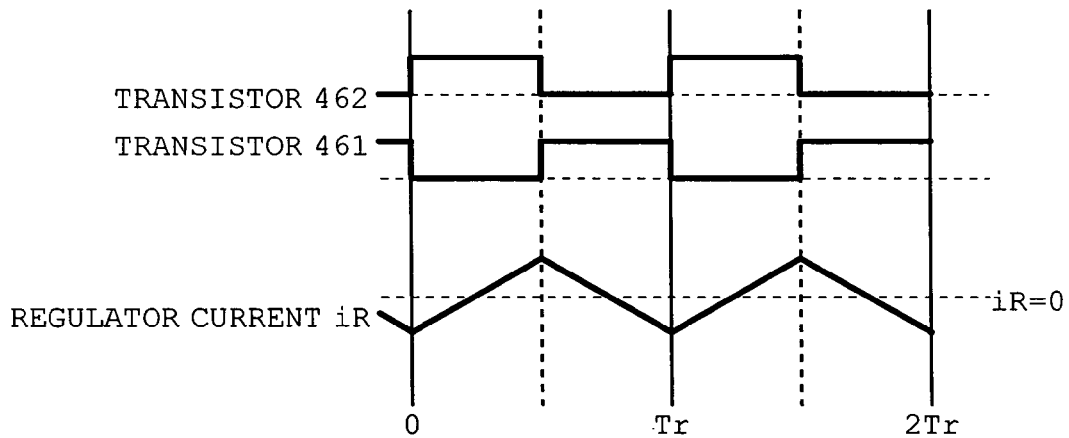

FIG. 10

| AMPLIFIER CIRCUIT STRUCTURE | ELECTROMAGNET CURRENT iL WHEN TRANSISTOR IS TURNED ON | ELECTROMAGNET CURRENT iL WHEN TRANSISTOR IS TURNED OFF | CURRENT DETECTION TIMING |
|---|---|---|---|
| AMPLIFIER CIRCUIT 810A | FROM COMMON NODE TO NEGATIVE ELECTRODE | FROM COMMON NODE TO POSITIVE ELECTRODE | UPON TURNING TRANSISTOR ON |
| AMPLIFIER CIRCUIT 810C | | | |
| AMPLIFIER CIRCUIT 810B | FROM POSITIVE ELECTRODE TO COMMON NODE | FROM NEGATIVE ELECTRODE TO COMMON NODE | UPON TURNING TRANSISTOR OFF |

FIG. 12
WHEN
ACTUAL VOLTAGE VALUE OF COMMON NODE R IS CONSIDERABLY
LOWER THAN VOLTAGE COMMAND VALUE MAKING THE VOLTAGE ERROR LARGE
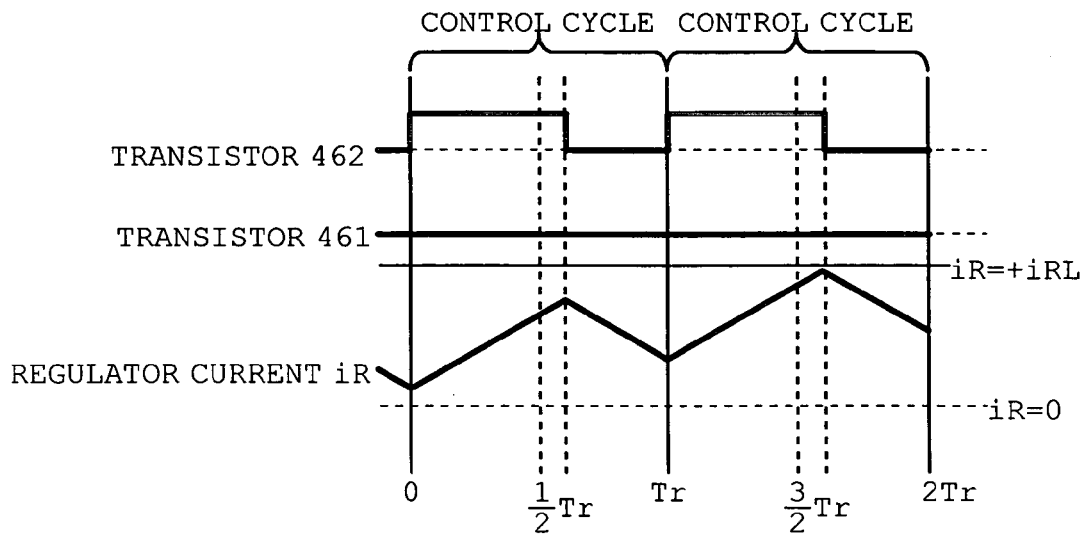
WHEN
ACTUAL VOLTAGE VALUE OF COMMON NODE R IS SLIGHTLY
LOWER THAN VOLTAGE COMMAND VALUE MAKING THE VOLTAGE ERROR SMALL
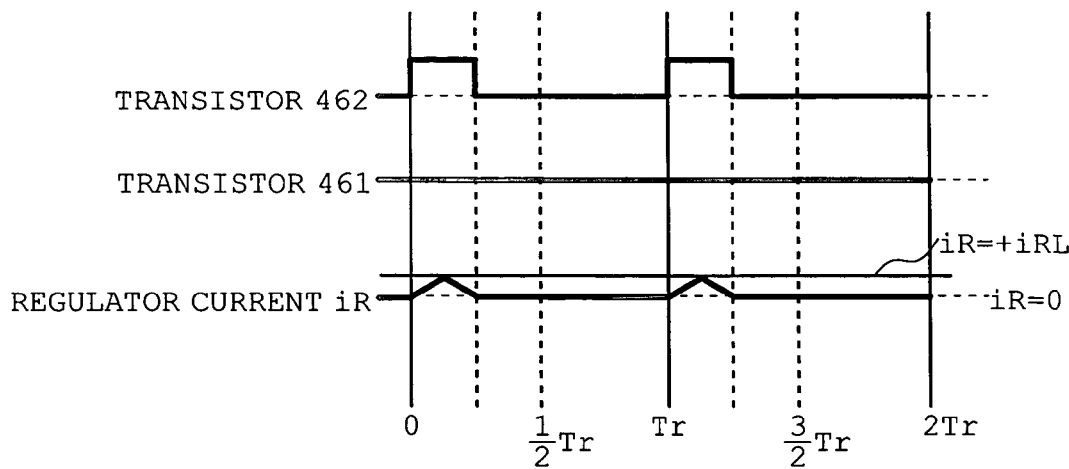

FIG. 13
WHEN
ACTUAL VOLTAGE VALUE OF COMMON NODE R IS CONSIDERABLY
HIGHER THAN VOLTAGE COMMAND VALUE MAKING THE VOLTAGE ERROR LARGE
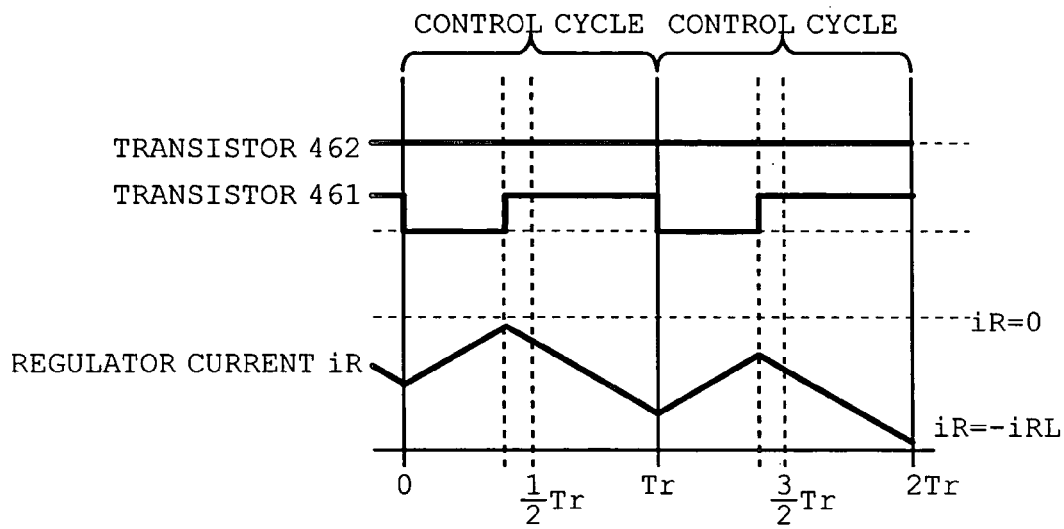
WHEN
ACTUAL VOLTAGE VALUE OF COMMON NODE R IS SLIGHTLY
HIGHER THAN VOLTAGE COMMAND VALUE MAKING THE VOLTAGE ERROR SMALL
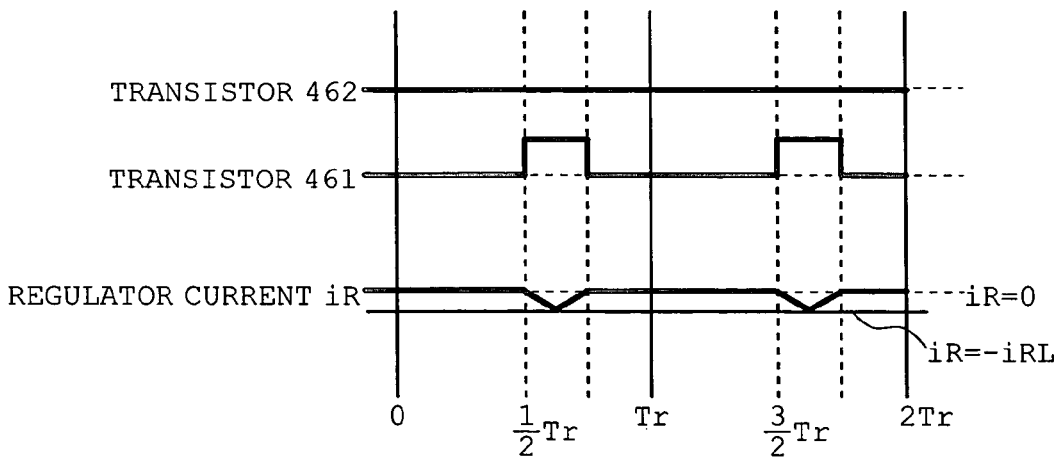

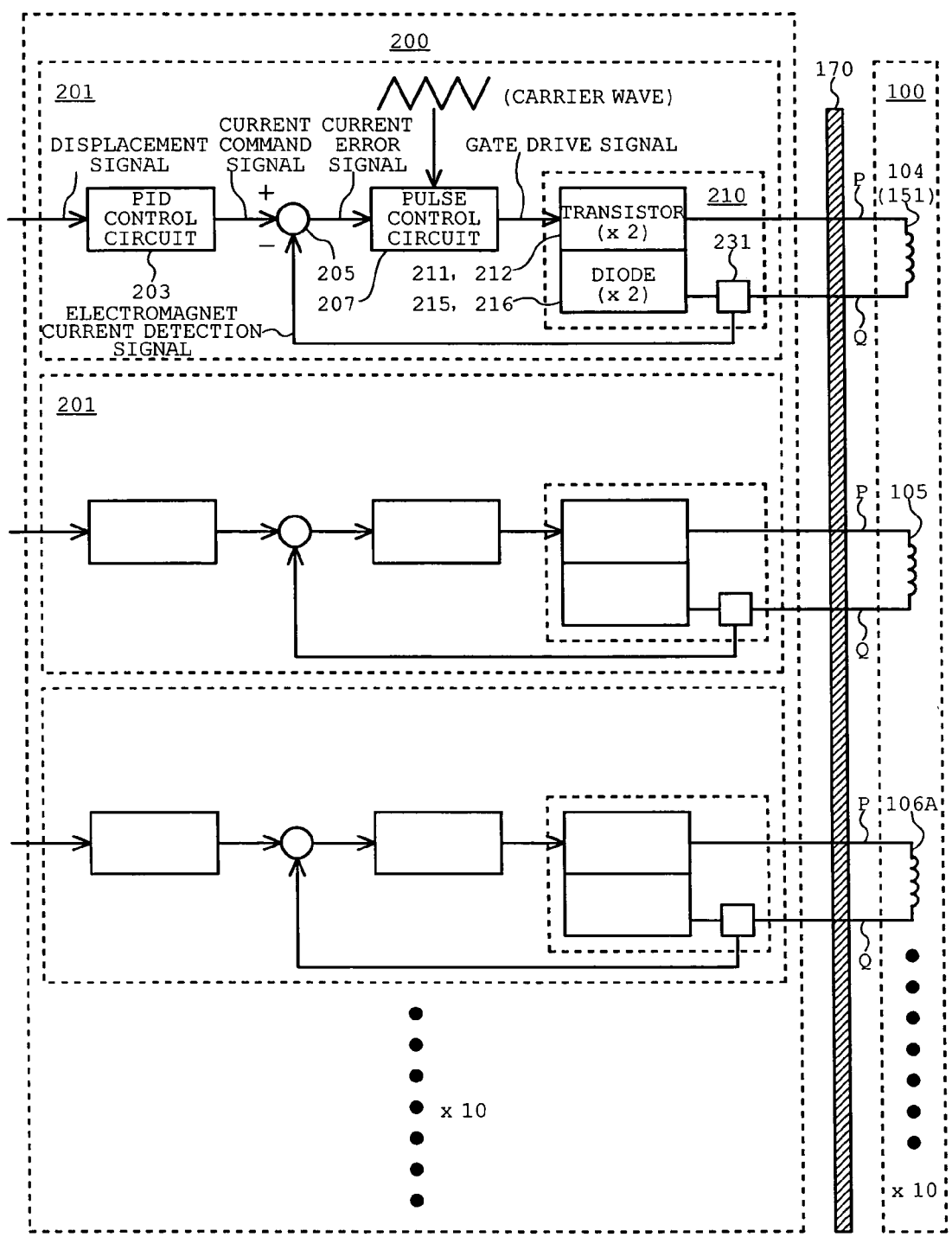

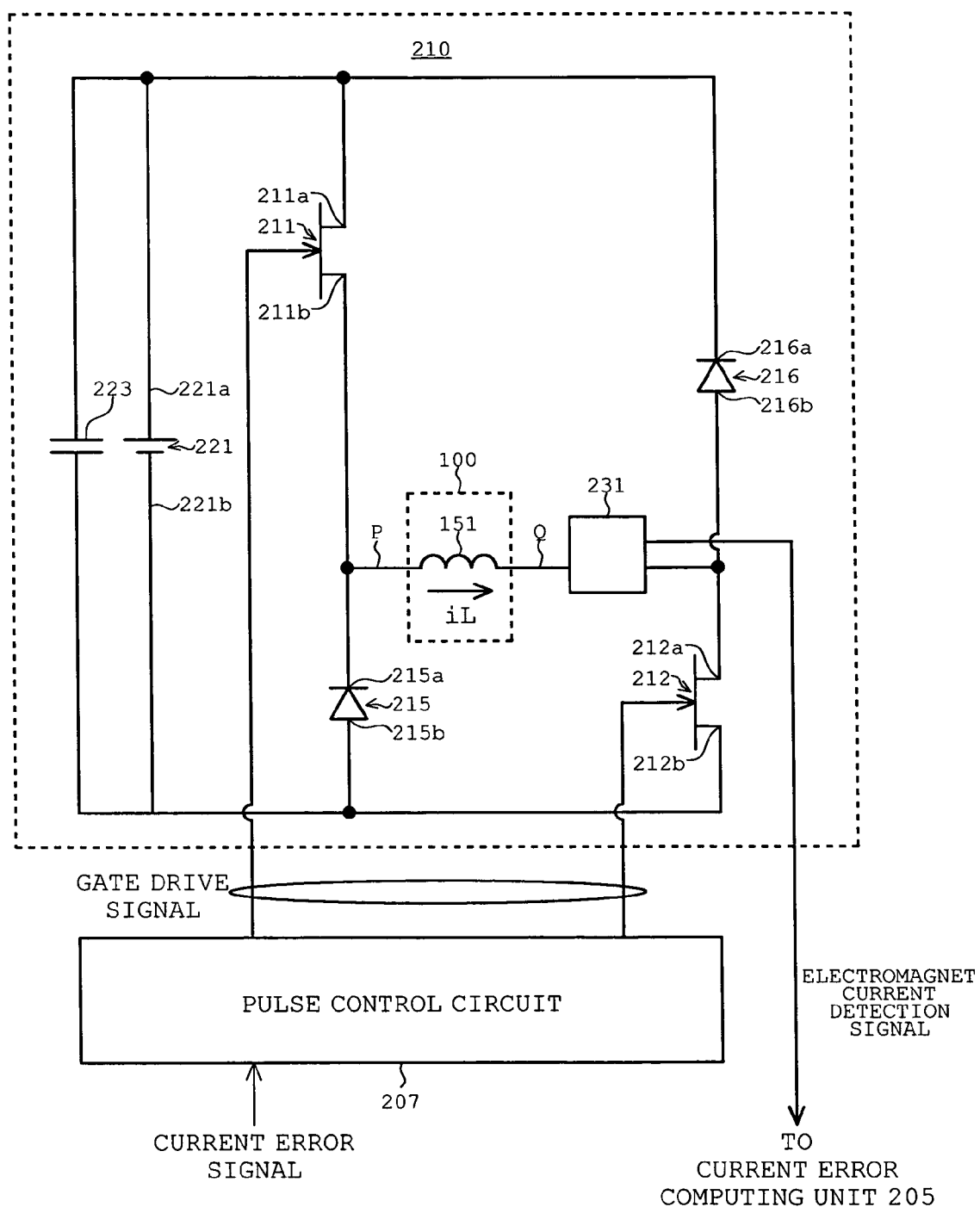

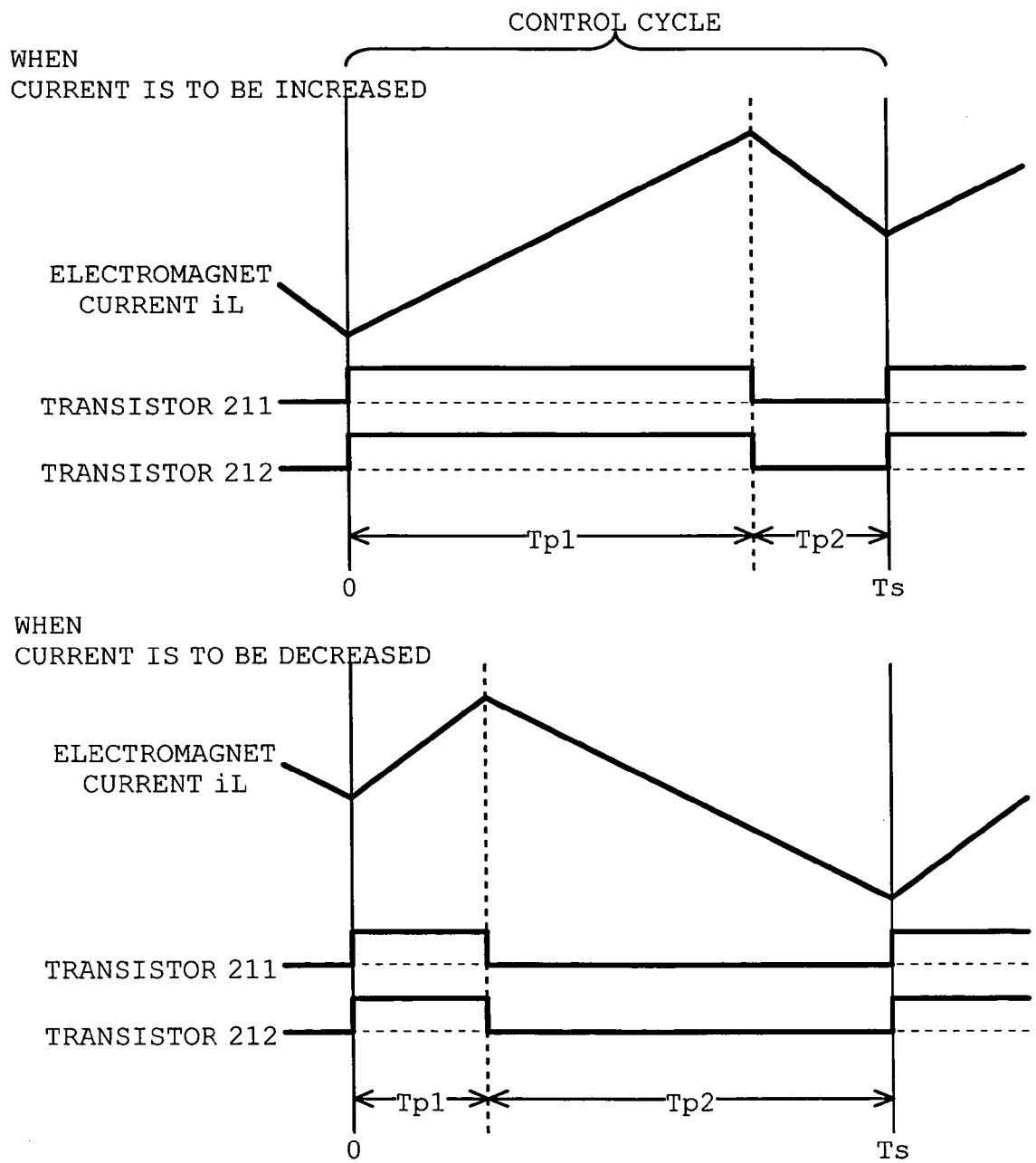

MAGNETIC BEARING DEVICE AND TURBO MOLECULAR PUMP WITH THE MAGNETIC BEARING DEVICE MOUNTED THERETO

BACKGROUND OF THE INVENTION

1. Field of the Invention

The present invention relates to a magnetic bearing device and a turbo molecular pump with the magnetic bearing device mounted thereto. More specifically, the present invention relates to a magnetic bearing device capable of lowering the costs required for the manufacture, installation, or the like of a turbo molecular pump by reducing the number of elements of an amplifier circuit that drives, through excitation, electromagnets as well as the number of wires of a cable that connects the each electromagnet and the amplifier circuit to each other, and to a turbo molecular pump with the magnetic bearing device mounted thereto.

2. Description of the Related Art

With the development of electronics in recent years, demands for semiconductors for forming memories, integrated circuits, etc. are rapidly increasing.

Those semiconductors are manufactured such that impurities are doped into a semiconductor substrate with a very high purity to impart electrical properties thereto, or semiconductor substrates with minute circuit patterns formed thereon are laminated.

Those manufacturing steps must be performed in a chamber with a high vacuum state so as to avoid influences of dust etc. in the air. This chamber is generally evacuated by a vacuum pump. In particular, a turbo molecular pump is widely used since it entails little residual gas and is easy of maintenance.

The semiconductor manufacturing process includes a number of steps in which various process gases are caused to act onto a semiconductor substrate, and the turbo molecular pump is used not only to evacuate the chamber but also to discharge those process gases from the chamber.

Further, in equipment for an electron microscope etc., a turbo molecular pump is used to create a high vacuum state in the chamber of the electron microscope etc. in order to prevent refraction etc. of an electron beam caused by the presence of dust or the like.

Such a turbo molecular pump is composed of a turbo molecular pump main body for evacuating the chamber of a semiconductor manufacturing apparatus, an electron microscope, or the like, and a control device for controlling the turbo molecular pump main body.

FIG. 14 is a vertical sectional view of the turbo molecular pump main body.

In FIG. 14, a turbo molecular pump main body 100 includes an outer cylinder 127 with an intake hole 101 formed on top thereof. Provided inside the outer cylinder 127 is a rotor 103 having in its periphery a plurality of rotor blades 102a, 102b, 102c, . . . serving as turbine blades for sucking and discharging gas and formed radially in a number of stages.

At the center of the rotor 103, a rotor shaft 113 is mounted with being supported in a levitating state in the air and controlled in position, for example, by a 5-axis control magnetic bearing.

Upper radial electromagnet 104 includes four electromagnets arranged in pairs in X- and Y-axis and plus- and minus-side directions (although not shown in the drawing, those electromagnets are referred to as 104X−, 104Y+, and 104Y−, as necessary). Further, there is provided an upper radial sensor 107 constituted of four electromagnets arranged in close proximity to and in correspondence with the upper radial electromagnets 104. The upper radial sensor 107 detects radial displacement of the rotor 103, transmitting a detection signal to a control device 200 (shown in FIG. 15).

In this control device 200, the upper radial electromagnets 104 are excited and controlled by a magnetic bearing control circuit 201 having a PID adjusting function, on the basis of a displacement signal detected by the upper radial sensor 107, thus the radial position of the upper portion of the rotor shaft 113 being adjusted.

The rotor shaft 113 is formed of a high-magnetic-permeability material (e.g., iron) and is adapted to be attracted by the magnetic force of the upper radial electromagnets 104. Such adjustment is conducted independently in the X-axis direction and the Y-axis direction.

Further, lower radial electromagnets 105 and a lower radial sensor 108 are arranged in the same way as the upper radial electromagnets 104 and the upper radial sensor 107. Like the radial position of the upper portion of the rotor shaft 113, the radial position of the lower portion of the rotor shaft 113 is adjusted (the lower radial electromagnets 105 are similarly referred to as 105X+, 105X−, 105Y+, and 105Y−, as necessary).

Further, axial electromagnets 106A and 106B each are arranged on the upper and lower sides of a metal disc 111 provided in the lower portion of the rotor shaft 113. The metal disc 111 is formed of a high-magnetic-permeability material such as iron. To detect axial displacement of the rotor shaft 113, an axial sensor 109 is provided, which transmits an axial displacement signal to the control device 200.

The axial electromagnets 106A and 106B are excited and controlled by the magnetic bearing control circuit 201 having a PID adjusting function on the basis of the axial displacement signal. The axial electromagnet 106A upwardly attracts the magnetic disc 111 by the magnetic force, and the axial electromagnet 106B downwardly attracts the magnetic disc 111.

In this way, the control device 200 has a function to appropriately control the magnetic force exerted on the metal disc 111 by the axial electromagnets 106A and 106B to magnetically levitate the rotor shaft 113 in the axial direction, thereby retaining the rotor shaft 113 in the space in a non-contact state.

Note that descriptions will be given later on the magnetic bearing control circuit 201.

A motor 121 is equipped with a plurality of magnetic poles, which are arranged circumferentially to surround the rotor shaft 113. The magnetic poles are controlled by the control device 200 to rotate the rotor shaft 113 through an electromagnetic force acting between the rotor shaft 113 and the magnetic poles.

The motor 121 also has an RPM sensor (not shown in the drawing) incorporated to output a detection signal, which is used for detection of RPM of the rotor shaft 113.

A phase sensor (not shown in the drawing) is attached, for example, in the vicinity of the lower radial sensor 108 to detect the phase of rotation of the rotor shaft 113. From detection signals of the phase sensor and the RPM sensor both, the control device 200 detects positions of the magnetic poles.

A plurality of stationary blades 123a, 123b, 123c, . . . are arranged so as to be spaced apart from the rotor blades 102a, 102b, 102c, . . . by small gaps. To downwardly transfer the molecules of exhaust gas through collision, the rotor blades

102*a*, 102*b*, 102*c*, . . . are inclined by a predetermined angle with respect to a plane perpendicular to the axis of the rotor shaft 113.

Similarly, the stationary blades 123 are also inclined by a predetermined angle with respect to a plane perpendicular to the axis of the rotor shaft 113, and extend toward the inner side of the outer cylinder 127 to be arranged alternately with the rotor blades 102.

The stationary blades 123 are supported at one end by being inserted into gaps between a plurality of stationary blade spacers 125*a*, 125*b*, 125*c*, . . . stacked together in stages.

The stationary blade spacers 125 are ring-shaped members, which are formed of a metal, such as aluminum, iron, stainless steel, or copper, or an alloy containing such metal as a component.

In the outer periphery of the stationary blade spacers 125, the outer cylinder 127 is secured in position with a small gap therebetween. At the bottom of the outer cylinder 127, there is arranged a base portion 129, and a threaded spacer 131 is arranged between the lowermost one of the stationary blade spacers 125 and the base portion 129. In the portion of the base portion 129 below the threaded spacer 131, there is formed a discharge outlet 133 which communicates with the outside.

The threaded spacer 131 is a cylindrical member formed of a metal, such as aluminum, copper, stainless steel, or iron, or an alloy containing such metal as a component, and has a plurality of spiral thread grooves 131*a* in its inner peripheral surface.

The spiral direction of the thread grooves 131*a* is determined such that when the molecules of the exhaust gas move in the rotating direction of the rotor 103, these molecules are transferred toward the discharge outlet 133.

Connected to the lowermost one of the rotor blades 102*a*, 102*b*, 102*c*, . . . of the rotor 103 is a rotor blade 102*d*, which extends vertically downwards. The outer peripheral surface of the rotor blade 102*d* sticks out toward the inner peripheral surface of the threaded spacer 131 in a cylindrical shape, and is in close proximity to the inner peripheral surface of the threaded spacer 131 with a predetermined gap therebetween.

The base portion 129 is a disc-like member constituting the base of the turbo molecular pump main body 100, and is generally formed of a metal, such as iron, aluminum, or stainless steel.

The base portion 129 physically retains the turbo molecular pump main body 100, and also functions as a heat conduction passage. Thus, the base portion 129 is preferably formed of a metal that is rigid and of high heat conductivity, such as iron, aluminum, or copper.

In the above-described construction, when the rotor blades 102 are driven and rotated by the motor 121 together with the rotor shaft 113, an exhaust gas from a chamber is sucked in through the intake hole 101 by the action of the rotor blades 102 and the stationary blades 123.

The exhaust gas sucked in through the intake hole 101 passes between the rotor blades 102 and the stationary blades 123, and is transferred to the base portion 129. At this point, the temperature of the rotor blades 102 is raised by frictional heat generated as the exhaust gas comes into contact with the rotor blades 102 and by heat generated and conducted from the motor 121. Such heat is transferred to the stationary blades 123 through radiation or through conduction of gas molecules of exhaust gas or the like.

The stationary blade spacers 125 are joined to one another on the outer periphery and send, to the outside, heat which the stationary blades 123 receive from the rotor blades 102 as well as frictional heat generated upon contact between exhaust gas and the stationary blades 123.

The exhaust gas transferred to the base portion 129 is sent to the discharge outlet 133 while being guided by the thread grooves 131*a* of the threaded spacer 131.

In the description above, the threaded spacer 131 is placed on the outer periphery of the rotor blade 102*d* and the inner peripheral surface of the threaded spacer 131 is scored with the thread grooves 131*a*. This may be reversed and the outer peripheral surface of the rotor blade 102*d* may be scored with thread grooves, whereas a spacer of which inner peripheral surface forms a cylindrical shape surrounds the rotor blade 102*d*.

Further, in order to prevent the exhaust gas sucked in through the intake hole 101 from entering the electrical portion composed of the motor 121, the lower radial electromagnet 105, the lower radial sensor 108, the upper radial electromagnet 104, the upper radial sensor 107, etc., the electrical portion is covered with a stator column 122, and the interior of this electrical portion is maintained at a predetermined pressure with a purge gas.

For this purpose, the base portion 129 is equipped with piping (not shown in the drawing), and the purge gas is introduced through the piping. The purge gas introduced is passed through the gap between a protective bearing 120 and the rotor shaft 113, the gap between the rotor and stator of the motor 121, and the gap between the stator column 122 and the rotor blades 102 before it is transmitted to the discharge outlet 133.

The turbo molecular pump main body 100 requires control based on individually adjusted specific parameters (e.g., identification of the model and characteristics corresponding to the model). To store the control parameters, the turbo molecular pump main body 100 contains an electronic circuit portion 141 in its main body. The electronic circuit portion 141 is composed of a semiconductor memory, such as EEP-ROM, electronic parts, such as semiconductor devices for access to the semiconductor memory, a substrate 143 for mounting these components thereto, etc.

This electronic circuit portion 141 is accommodated under an RPM sensor (not shown in the drawing) near the center of the base portion 129 constituting the lower portion of the turbo molecular pump main body 100, and is closed by a hermetic bottom cover 145.

In some cases, a process gas is introduced to a chamber with its temperature raised in order to enhance the reactivity. Such process gas is cooled upon discharge and, reaching a certain temperature, could change into a solid to precipitate in the exhaust system. This type of process gas, one that becomes solid when cooled, adheres to the interior of the turbo molecular pump main body 100 and builds up.

For instance, a vapor pressure curve shows that $SiCl_4$ used as a process gas for an Al etching device precipitates at low vacuum (760 torr to $10^{-2}$ torr) and low temperature (about 20° C.) to produce a solid product (e.g., $AlCl_3$), which adheres and builds up in the turbo molecular pump main body 100. As the precipitate of the process gas builds up in the turbo molecular pump main body 100, the pump flow path is clogged with the deposit, thereby lowering the performance of the turbo molecular pump main body 100. The solid product tends to coagulate and adhere in the area near the discharge outlet where the temperature is low, in particular, around the rotor blades 102 and the threaded spacer 131.

A conventional measure taken to solve this problem is to wind a heater (not shown in the drawing) and a ring-like water-cooled tube 149 around the outer periphery of the base portion 129 or other portion while burying a temperature sensor (not shown in the drawing) (e.g., thermistor) in, for example, the base portion 129, so that the temperature of the base portion 129 is kept high at a set temperature by controlling the heating effect of the heater and the cooling effect of the water-cooled tube 149 based on a signal from the temperature sensor (temperature management system, hereinafter abbreviated as TMS).

Given next is a detailed description of the magnet bearing control circuit 201 for exciting and controlling the upper radial electromagnets 104, the lower radial electromagnets 105, and the axial electromagnets 106A and 106B of the turbo molecular pump main body 100 and the control device 200 structured as above.

A structural diagram of the magnetic bearing control circuit and a control circuit is shown in FIG. 15.

In FIG. 15, the control device 200 has the magnetic bearing control circuit 201 provided for the respective electromagnets including the upper radial electromagnets 104 and the lower radial electromagnets 105. Accordingly, in the case of a 5-axis control magnetic bearing, there are ten of the same magnetic bearing control circuits (each of which is denoted by 201 and only some of them are shown in the drawing) in the control device 200.

The magnetic bearing control circuit 201 has a PID control circuit 203 to which a displacement signal sent from the upper radial sensor 107 or other sensors is inputted. The PID control circuit 203 performs PID control on the displacement signal inputted, and outputs as a current command signal a current value necessary to drive the upper radial electromagnets 104 (the current value is hereinafter referred to as current command value) to a current error computing unit 205.

The current error computing unit 205 calculates an error between the current command signal outputted from the PID control circuit 203 and an electromagnet current detection signal outputted from an amplifier circuit 210, (the error is hereinafter referred to as current error value) which will be described later. The current error computing unit 205 then outputs the obtained current error value as a current error signal to a pulse control circuit 207.

The pulse control circuit 207, along with the amplifier circuit 210, will be described next.

A circuit diagram of the amplifier circuit is shown in FIG. 16.

In FIG. 16, the electromagnet coil 151, which constitutes the upper radial electromagnets 104 or other electromagnets, is connected at one end to a positive electrode 221a of a power source 221 through a transistor 211 and is connected at the other end to a negative electrode 221b of the power source 221 through an electromagnetic current detecting circuit 231 and through a transistor 212.

The transistors 211 and 212 are so-called N type power MOSFETs. The transistor 211 has at one end a drain terminal 211a connected to the positive electrode 221a and has at the other end a source terminal 211b connected to the one end of the electromagnet coil 151. The transistor 212 has at one end a drain terminal 212a connected to the electromagnet current detecting circuit 231 and has at the other end a source terminal 212b connected to the negative electrode 221b.

On the other hand, a diode 215 provided for current regeneration has a cathode terminal 215a connected to one end of the electromagnet coil 151 and has an anode terminal 215b connected to the negative electrode 221b. Similarly, a diode 216 for current regeneration has a cathode terminal 216a connected to the positive electrode 221a and has an anode terminal 216b connected to the other end of the electromagnet coil 151 through the electromagnetic current detecting circuit 231.

The electromagnet current detecting circuit 231 is, for example, a hole sensor serving as a current sensor, and detects the amount of a current flowing in the electromagnet coil 151 (hereinafter referred to as electromagnet current iL) to output the detected current value as an electromagnet current detection signal to the current error computing unit 205.

Also provided between the positive electrode 221a and negative electrode 221b of the power source 221 is a stabilizing capacitor 223 for stabilizing the power source 221.

A node P, which designates the section between the one end of the electromagnet coil 151 and the transistor 211, and a node Q, which designates the section between the other end of the electromagnet coil 151 and the electromagnet current detecting circuit 231, constitute a cable 170 for connecting the control device 200 to the turbo molecular pump main body 100 as shown in FIG. 15, which is because the electromagnet coil 151 is an element of the turbo molecular pump main body 100.

As the magnetic bearing controlling circuit 201 is provided for the respective electromagnets including the upper radial electromagnets 104 and the lower radial electromagnets 105, the amplifier circuit 210 structured as above is provided for each of those electromagnets, meaning that there are identical amplifier circuits (each of which is denoted by 210) for the lower radial electromagnets 105 and for the axial electromagnets 106A and 106B in addition to the amplifier circuit 210 for the upper radial electromagnets 104.

The pulse control circuit 207 determines the pulse width (pulse width time Tp1, Tp2) of pulses to be generated within a control cycle Ts, which is one cycle by PWM control, based on a current error signal outputted from the current error computing unit 205 in order to increase or decrease the electromagnet current iL. At this point, the pulse control circuit 207 receives a carrier wave having a given cycle (for example, 25 kHz) and the control cycle Ts is determined in accordance with the cycle of the carrier wave. The pulse control circuit 207 thus outputs a signal having the pulse width time Tp1 or Tp2 (hereinafter referred to as gate drive signal) within the control cycle Ts to gate terminals of the transistors 211 and 212, to thereby switch on or off the transistors 211 and 212.

In this structure, when a current command value outputted from the PID control circuit 203 is larger than a current detection value detected at the electromagnet current detecting circuit 231, in other words, when the electromagnet current iL is to be increased, the transistors 211 and 212 are both kept turned on for a time period corresponding to the pulse width time Tp1 within the control cycle Ts and are both kept turned off during a time period corresponding to the pulse width time Tp2 (=Ts−Tp1) as shown in FIG. 17.

While the transistors 211 and 212 are both kept turned on, the electromagnet current iL flowing from the positive electrode 221a to the negative electrode 221b through the transistor 211, the electromagnet coil 151, and the transistor 212 is supplied to the electromagnet coil 151 (the electromagnet current iL is increased during this period). On the other hand, while the transistors 211 and 212 are both kept turned off, the electromagnet current iL regenerated from the negative electrode 221b to the positive electrode 221a through the diode 215, the electromagnet coil 151, and the diode 216 is supplied to the electromagnet coil 151 (the electromagnet current iL during this period is smaller than when the transistors 211 and 212 are both turned on).

Therefore, the electromagnet current iL within one control cycle Ts is (ultimately) increased by setting the pulse width time Tp1 longer than the pulse width time Tp2.

This is all reversed in the case where a current command value outputted from the PID control circuit 203 is smaller than a current detection value detected at the electromagnet current detecting circuit 231, in other words, when the electromagnet current iL is to be decreased. The electromagnet current iL within one control cycle Ts is decreased by setting the pulse width time Tp2 longer than the pulse width time Tp1.

By turning one of the transistors 211 and 212 of the amplifier circuit 210 on, a flywheel current is maintained in the amplifier circuit 210 (not shown in the drawing) as disclosed in JP 3176584 B.

Maintaining a flywheel current in the amplifier circuit 210 makes it possible to reduce the hysteresis loss in the amplifier circuit 210 and lower the total current consumption of the circuit. In addition, with the transistors 211 and 212 controlled in this manner, high-frequency noise of harmonics or the like is reduced in the turbo molecular pump main body 100.

As has already been described, the magnetic bearing control circuit 201 is provided for the respective electromagnets including the upper radial electromagnets 104 and the lower radial electromagnets 105 and accordingly the control device 200 has ten identical amplifier circuits (each denoted by 210). Taking into account this and the fact that, in each amplifier circuit 210, two transistors 211 and 212 and two diodes 215 and 216 are necessary for every electromagnet coil 151, the control device 200 needs twenty transistors and twenty diodes in total to drive, through excitation, every electromagnet.

Meanwhile, the transistors 211 and 212 and the diodes 215 and 216 have to be large in element size (channel width for the transistors and junction area for the diodes) in order to supply a large current to the electromagnet coil 151.

It is therefore difficult to downsize the amplifier circuit 210 while ensuring enough current supply to the electromagnet coil 151 and, as a result, reducing the control device 200 in size is made difficult.

The control device 200 therefore takes up much space when installing the turbo molecular pump main body 100 and the control device 200 in a clean room or the like, and it could lead to an increase in cost for the installation.

In addition, as described above, the nodes P and Q that connect the amplifier circuit 210 and the electromagnet coil 151 to each other constitute the cable 170 laid between the control device 200 and the turbo molecular pump main body 100 for interconnection. With the control device 200 having ten amplifier circuits (210), there are twenty wires in total as the nodes P and Q in the cable 170.

Consequently, the cable 170 cannot be reduced in number of wires, thereby making it difficult to lower the cost of the cable 170.

Furthermore, the wires serving as the nodes P and Q have to be large in diameter in order to send a large current to the electromagnet coil 151.

This makes it difficult to reduce the cable 170 in diameter and, accordingly, downsizing of a connector (not shown in the drawing) serving as an entrance and an exit of the turbo molecular pump main body 100 for the cable 170 is also made difficult. The connector on the side of the turbo molecular pump main body 100 bears a special task to enable the cable 170 to serve as an input/output cable while maintaining the vacuum state in the turbo molecular pump main body 100. Therefore, a difficulty in reducing the diameter of the connector could directly lead to a rise in total manufacture cost of the turbo molecular pump.

SUMMARY OF THE INVENTION

The present invention has been made in view of the above-mentioned problems inherent in the prior art, and an object of the present invention is therefore to provide a magnetic bearing device capable of lowering the cost of manufacturing a turbo molecular pump by reducing the number of elements of an amplifier circuit that drives, through excitation, electromagnets and a turbo molecular pump with the magnetic bearing device mounted thereto.

According to the present invention, there is provided a magnetic bearing device including: a rotor; position control means for controlling at least one of a radial position and an axial position of the rotor by electromagnets; first voltage generating means for generating a first voltage between a first positive electrode and a negative electrode; second voltage generating/maintaining means for generating a second voltage, which is lower than the first voltage, between a second positive electrode and the negative electrode and maintaining the second voltage, the first and second positive electrodes being different from each other; and first excitation control means for exciting and controlling the electromagnets by one of a first supply current supplied from the second positive electrode to the negative electrode and a first regenerated current regenerated from the second positive electrode to the first positive electrode, in which the first excitation control means includes: a first switch element for connecting and disconnecting the first supply current; a first control circuit for controlling connection and disconnection of the first switch element; and a first rectifier element for causing the first regenerated current to flow in the direction of its regeneration.

The electromagnets are driven when the first supply current flowing from the second positive electrode to the negative electrode is supplied to the electromagnets by connecting the first switch element. On the other hand, when the first switch element is disconnected, the electromagnets are supplied with the first regenerated current flowing from the second positive electrode to the first positive electrode. At this point, the voltage of the second positive electrode is dropped by the first excitation control means. However, in either case, the second voltage generating/maintaining means keeps the second positive electrode at the second voltage. Thus the first excitation control means and the second voltage generating/maintaining means together make it possible to increase or decrease the amount of current flowing in the electromagnets.

This enables the first excitation control means for exciting and controlling the electromagnets when the first excitation control means is merely composed of the first switch element and the first rectifier element.

With the elements that constitute the first excitation control means thus reduced in number, the magnetic bearing device having this first excitation control means is less likely to malfunction. In addition, power consumption of the magnetic bearing device and heat generated in the magnetic bearing device can be reduced.

The second voltage is desirably about half the first voltage.

Also, according to the present invention, there is provided a magnetic bearing device including: a rotor; position control means for controlling at least one of a radial position and an axial position of the rotor by electromagnets; first voltage generating means for generating a first voltage between a first positive electrode and a negative electrode; second voltage generating/maintaining means for generating a second voltage, which is lower than the first voltage, between a second positive electrode and the negative electrode and maintaining the second voltage, the first and second positive electrodes being different from each other; and second excitation control means for exciting and controlling the electromagnets by one of a second supply current supplied from the first positive electrode to the second positive electrode and a second regenerated current regenerated from the negative electrode to the second positive electrode, in which the second excitation control means includes: a second switch element for connecting and disconnecting the second supply current; a second control circuit for controlling connection and disconnection of the second switch element; and a second rectifier element for causing the second regenerated current to flow in the direction of its regeneration.

The electromagnets are driven when the second supply current flowing from the first positive electrode to the second positive electrode is supplied to the electromagnets by connecting the second switch element. On the other hand, when the second switch element is disconnected, the electromagnets are supplied with the second regenerated current flowing from the negative electrode to the second positive electrode. At this point, the voltage of the second positive electrode is raised by the second excitation control means. However, in either case, the second voltage generating/maintaining means keeps the second positive electrode at the second voltage. Thus the second excitation control means and the second voltage generating/maintaining means together make it possible to increase or decrease the amount of current flowing in the electromagnets.

This enables the second excitation control means for exciting and controlling the electromagnets when the second excitation control means is merely composed of the second switch element and the second rectifier element, as in the first aspect of the present invention.

Accordingly, a structure that is easy to design can be chosen in designing a magnetic bearing device and a structure that is easy to control can be chosen in controlling the magnetic bearing device.

Further, according to the present invention, there is provided a magnetic bearing device including: a rotor; position control means for controlling at least one of a radial position and an axial position of the rotor by a plurality of electromagnets; first voltage generating means for generating a first voltage between a first positive electrode and a negative electrode; second voltage generating/maintaining means for generating a second voltage, which is lower than the first voltage, between a second positive electrode and the negative electrode and maintaining the second voltage, the first and second positive electrodes being different from each other; first excitation control means for exciting and controlling at least one of the plural electromagnets by one of a first supply current supplied from the second positive electrode to the negative electrode and a first regenerated current regenerated from the second positive electrode to the first positive electrode; and second excitation control means for exciting and controlling at least one of the electromagnets, excluding the one or more that are excited and controlled by the first excitation control means, by one of a second supply current supplied from the first positive electrode to the second positive electrode and a second regenerated current regenerated from the negative electrode to the second positive electrode, in which: the first excitation control means includes: a first switch element for connecting and disconnecting the first supply current; a first control circuit for controlling connection and disconnection of the first switch element; and a first rectifier element for causing the first regenerated current to flow in the direction of its regeneration; and the second excitation control means includes: a second switch element for connecting and disconnecting the second supply current; a second control circuit for controlling connection and disconnection of the second switch element; and a second rectifier element for causing the second regenerated current to flow in the direction of its regeneration.

The second voltage generating/maintaining means keeps the second positive electrode at the second voltage. Thus the combination of the first excitation control means and the second voltage generating/maintaining means and the combination of the second excitation control means and the second voltage generating/maintaining means make it possible to increase or decrease the amount of current flowing in the electromagnets.

In this way, effects similar to those of the first and second aspects of the present invention can be obtained.

Further, according to the present invention, the magnetic bearing device is characterized in that the electromagnets are divided into two groups, one excited and controlled by the first excitation control means and the other excited and controlled by the second excitation control means, so that the amount of current flowing from the first positive electrode to the second positive electrode and the amount of current flowing from the second positive electrode to the negative electrode are made equivalent to each other.

By dividing the plural electromagnets into groups in a manner that makes the amount of current flowing from the first positive electrode to the second positive electrode equivalent to the amount of current flowing from the second positive electrode to the negative electrode, the current the second voltage generating/maintaining means has to supply is lessened in amount.

This makes it possible to downsize the circuit that constitutes the second voltage generating/maintaining means and accordingly the magnetic bearing device can further be reduced in size.

Further, according to the present invention, there is provided a magnetic bearing device, further including: a resistor connected at one end to the negative electrode; and electromagnet current detecting means for detecting the value of one of currents supplied to and regenerated by the electromagnets by flowing the current in the resistor.

The electromagnet current detecting means uses the resistor that is connected at one end to the negative electrode to detect the value of current supplied to the electromagnets or the like. For that reason, the electromagnet current detecting means does not receive an input of high voltage. This enables the electromagnet current detecting means to avoid noise and accordingly detect the current with accuracy even when a differential amplifier or the like is employed. This also eliminates the need to use a highly precise differential amplifier, an expensive hole sensor serving as a current sensor, or the like, thereby simplifying the structure of the electromagnet current detecting means and lowering the cost of parts.

Further, according to the present invention, the magnetic bearing device is characterized in that: the plural electromagnets are provided; and the each electromagnet forms at one end a common node, which is kept at the second voltage by the second voltage generating/maintaining means.

Since the each electromagnet forms at one end a common node and the second voltage generating/maintaining means keeps the node at the second voltage, the first excitation control means (or the second excitation control means), the second voltage generating/maintaining means, and the each electromagnet are connected to one another merely by the common node at the one end of the each electromagnet and by a wire at the other end of the each electromagnet.

In this way, the number of wires necessary to interconnect the first excitation control means (or the second excitation control means), the second voltage generating/maintaining means, and the each electromagnet is reduced and the wiring cost can be lowered.

Further, according to the present invention, the second voltage generating/maintaining means includes: a voltage error computing unit for calculating an error between the voltage of the one end of the each electromagnet and a voltage command value; and a regulator circuit for adjusting the second voltage in accordance with the error calculated by the voltage error computing unit.

Thus the second voltage generating/maintaining means is controlled to keep the one end of the each electromagnet at the second voltage based on the actual voltage of the one end of the each electromagnet. Accordingly, the second voltage generating/maintaining means can be structured in a manner that allows the first excitation control means and the second excitation control means to share the second voltage generating/maintaining means.

Further, according to the present invention, the magnetic bearing device is characterized in that: the second voltage generating/maintaining means has a regulator circuit for adjusting the second voltage; and a current flow is controlled so that a current flowing between the regulator circuit and the one end of the each electromagnet does not exceed a given limit.

The regulator circuit controls a current flowing between the regulator circuit and the one end of the each electromagnet so that the current does not exceed a limit. Therefore, ripples of the current flowing between the regulator circuit and the one end of the each electromagnet can be reduced by setting the limit appropriately.

The current flowing in elements that constitute the regulator circuit can thus be decreased and less heat is generated from these elements, which makes it possible to prolong the lifetime of the device. In addition, parts cost is lowered and the reliability Of the magnetic bearing device can be improved.

Furthermore, ripples of the voltage of the one end of the each electromagnet can be reduced. This makes it possible to reduce the volume of, for example, a stabilizing capacitor, which is provided to stabilize the voltage of the one end of the each electromagnet, and, accordingly, to reduce the magnetic bearing device in size.

Further, according to the present invention, the magnetic bearing device is characterized in that the limit is changed in accordance with an error between the voltage of the one end of the each electromagnet and the voltage command value.

The limit of the current flowing between the regulator circuit and the one end of the each electromagnet is changed appropriately based on an error between the voltage of the one end of the each electromagnet and the voltage command value. If the limit is set on higher level as the error increases, the regulator circuit can be controlled without being influenced by the current limit. If the limit is set on lower level to adapt to a small error, the current in this case experiences fewer ripples.

Further, according to the present invention, the magnetic bearing device is characterized in that: the regulator circuit includes: a choking coil connected to the one end of the each electromagnet; a third switch element for connecting and disconnecting a current that flows between the choking coil and the negative electrode; a third rectifier element for causing a current to flow from the negative electrode to the choking coil; a fourth switch element for connecting and disconnecting a current that flows between the first positive electrode and the choking coil; and a fourth rectifier element for causing a current to flow from the choking coil to the first positive electrode; to raise the voltage of the one end of the each electromagnet, the third switch element is kept disconnected while controlling connection and disconnection of the fourth switch element; and to drop the voltage of the one end of the each electromagnet, the fourth switch element is kept disconnected while controlling connection and disconnection of the third switch element.

To raise the voltage of the one end of the each electromagnet, the third switch element is kept disconnected while controlling connection and disconnection of the fourth switch element. In this case, during a period in which the fourth switch element is connected, an increased amount of current is supplied to the one end of the each electromagnet whereas the current supply to the one end of the each electromagnet is decreased as the fourth switch element is disconnected due to a regenerated current flowing through the third rectifier element. While the current supplied to the one end of the each electromagnet is decreased, the third switch element is disconnected and therefore the current does not become a negative current.

In addition, to drop the voltage of the one end of the each electromagnet, the fourth switch element is kept disconnected while controlling connection and disconnection of the third switch element. In this case, during a period in which the third switch element is connected, a decreased amount of current is supplied to the one end of the each electromagnet whereas the current supply to the one end of the each electromagnet is increased as the third switch element is disconnected due to a regenerated current flowing through the fourth rectifier element. While the current supplied to the one end of the each electromagnet is increased, the fourth switch element is disconnected and therefore the current does not become a positive current.

Therefore, ripples of the current flowing between the regulator circuit and the one end of the each electromagnet can be reduced.

Further, according to the present invention, there is provided a turbo molecular pump including the magnetic bearing device, characterized in that: the rotor has rotor blades and a rotor shaft placed at the center of the rotor blades; and the position control means levitates the rotor shaft by a magnetic force.

The magnetic bearing device is mounted to a turbo molecular pump. The turbo molecular pump mounted with the magnetic bearing device can accordingly be reduced in size.

Further, according to the present invention, there is provided a turbo molecular pump, further including: a turbo molecular pump main body having at least the rotor and the position control means; and a control device having at least the second excitation control means, in which the turbo molecular pump main body and the control device are integrated into one.

The first excitation control means and second excitation control means described above can be reduced in size.

Therefore, the control device that has the first excitation control means and the second excitation control means can also be reduced in size.

This makes it possible to integrate the control device and the turbo molecular pump main body into one, eliminating the need for wires or the like that connect the control device and the turbo molecular pump main body to each other.

Therefore, less cost is needed in manufacturing and installing the turbo molecular pump.

BRIEF DESCRIPTION OF THE DRAWINGS

In the accompanying drawings:

FIG. 5 is a time chart showing control of a regulator circuit (for when the voltage of a common node R is to be raised);

FIG. 7 is a time chart showing control of a regulator circuit (for when the voltage of the common node R is to be dropped);

FIG. 10 is a diagram showing timing of detecting a current in an electromagnet current detecting circuit;

FIG. 12 is a time chart showing control of a regulator circuit according to current mode control (for when the voltage of the common node R is to be raised);

FIG. 13 is a time chart showing control of the regulator circuit according to current mode control (for when the voltage of the common node R is to be dropped);

FIG. 15 is a structural diagram of a conventional magnetic bearing control circuit and control circuit;

FIG. 16 is a circuit diagram of a conventional amplifier circuit; and

FIG. 17 is a time chart showing control of the conventional amplifier circuit.

DETAILED DESCRIPTION OF THE PREFERRED EMBODIMENTS

Embodiment 1 of the present invention is described below.

Figure 1:
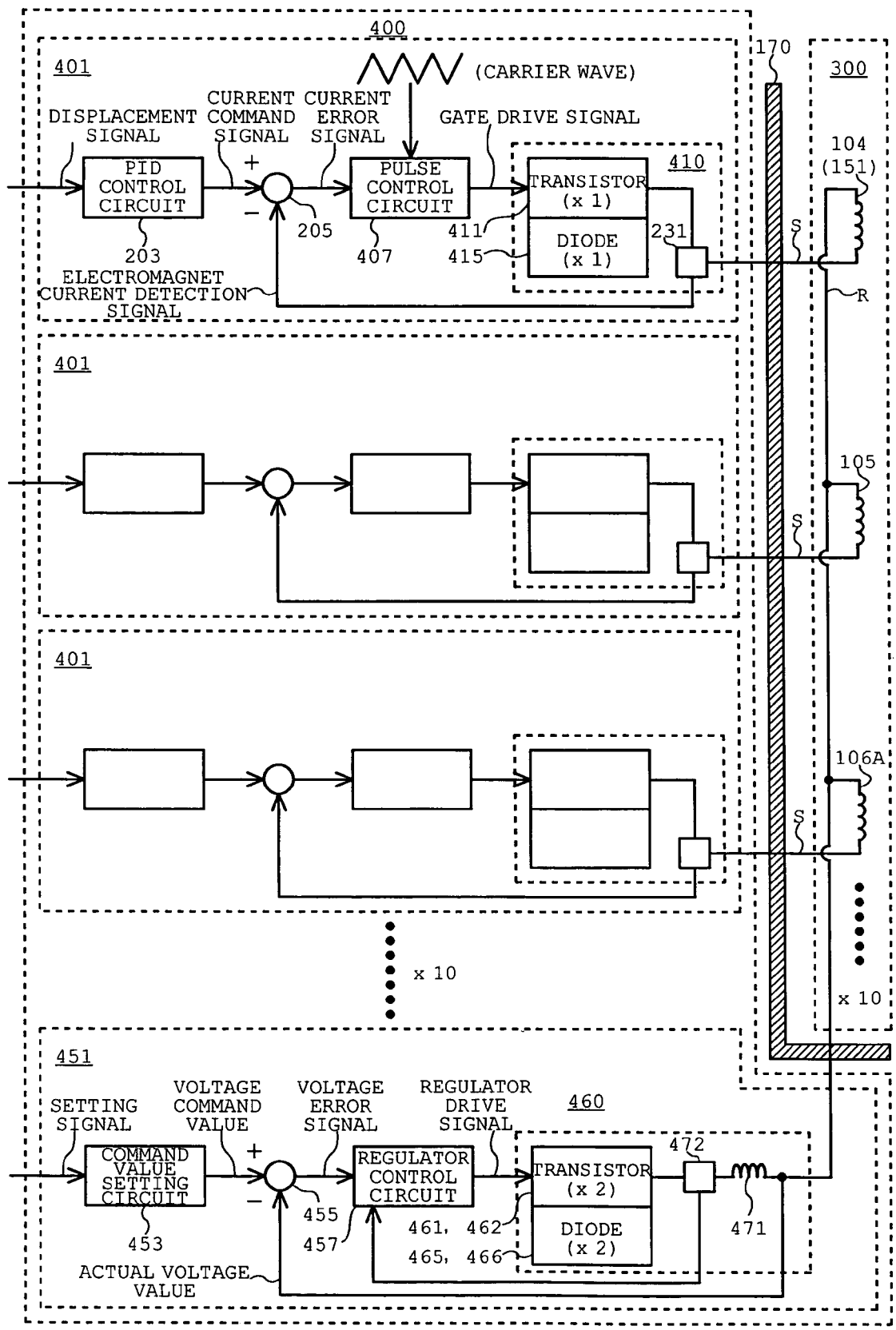
FIG. 1 is a structural diagram of a magnetic bearing control circuit and a control circuit according to Embodiment 1 of the present invention.

FIG. 1 shows a structural diagram of a magnetic bearing control circuit and control circuit according to Embodiment 1 of the present invention. Components in FIG. 1 that are identical with those in FIG. 15 are denoted by the same reference symbols and descriptions thereof are omitted here.

In FIG. 1, a turbo molecular pump main body 300 has electromagnet coils which constitute upper radial electromagnets 104, lower radial electromagnets 105, and other electromagnets. The electromagnet coils are each denoted by 151, and form a common node at one end (the node is referred to as common node R).

A control device 400 has a magnetic bearing control circuit 401, which is provided for the respective electromagnets including the upper radial electromagnets 104 and the lower radial electromagnets 105. In the case of a 5-axis control magnetic bearing, the control device 400 has ten of the same magnetic bearing control circuits (each of which is denoted by 401).

As in prior art, the magnetic bearing control circuit 401 has a PID control circuit 203 and a current error computing unit 205, which exert control in accordance with a displacement signal sent from an upper radial sensor 107 or other sensors. As a result, the current error computing unit 205 outputs a current error signal to a pulse control circuit 407.

The pulse control circuit 407 will be described along with an amplifier circuit 410.

Figure 2:
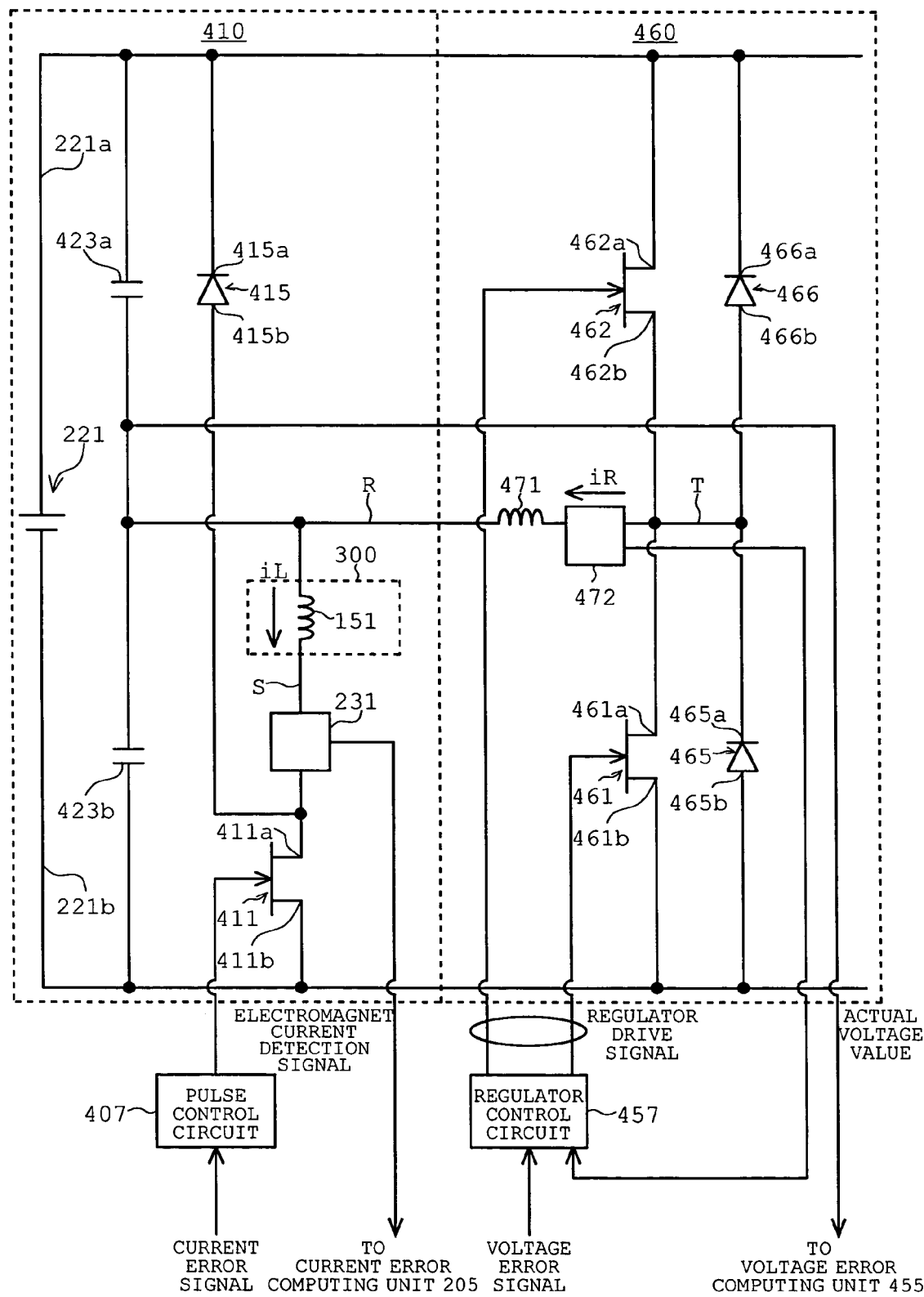
FIG. 2 is a circuit diagram of an amplifier circuit according to Embodiment 1 of the present invention.

A circuit diagram of the amplifier circuit 410 is shown in FIG. 2. Components in FIG. 2 that are identical to those in FIG. 16 are denoted by the same reference symbols and descriptions thereof will be omitted here.

In FIG. 2, one end of the electromagnet coil 151 is connected to the common node R. The other end of the electromagnet coil 151 is connected to a negative electrode 221b of a power source 221 through an electromagnet current detecting circuit 231 and through a transistor 411.

Similar to prior art, the transistor 411 is an N type power MOSFET. The transistor 411 has at one end a drain terminal 411a connected to the electromagnet current detecting circuit 231 and has at the other end a source terminal 411b connected to the negative electrode 221b.

A diode 415 for current regeneration has a cathode terminal 415a connected to a positive electrode 221a of the power source 221 and has an anode terminal 415b connected to the drain terminal 411a of the transistor 411.

The electromagnet current detecting circuit 231 detects the amount of a current iL flowing in the electromagnet coil 151 and outputs the detected current value as an electromagnet current detection signal to the current error computing unit 205. The electromagnet current detecting circuit 231 is, for example, a hole sensor serving as a current sensor.

Figure 3:
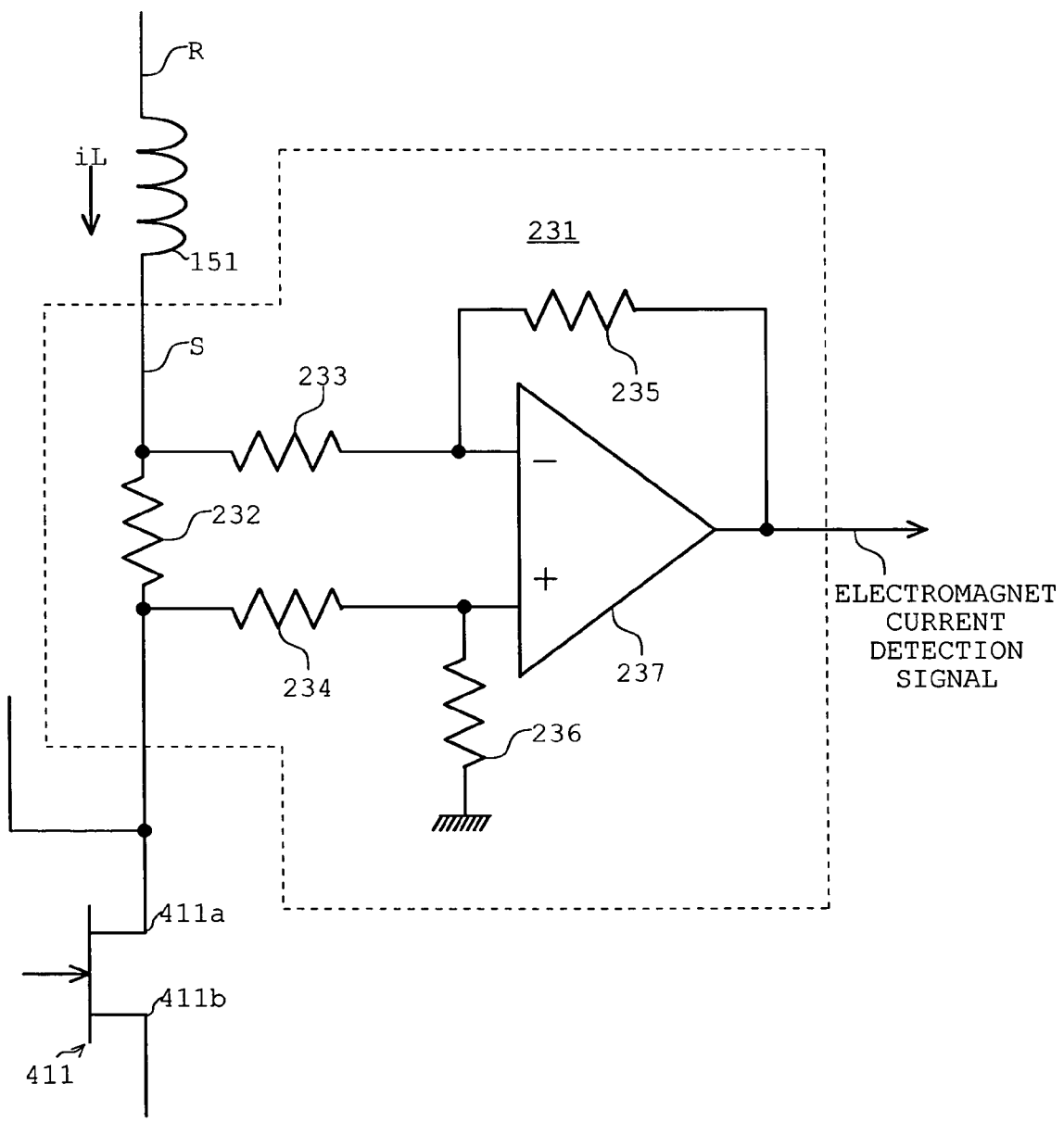
FIG. 3 is a circuit diagram of an electromagnet current detecting circuit.

An alternative to the use of a hole sensor serving as a current sensor is to build the electromagnet current detecting circuit 231 from a detection resistor 232 and a differential amplifier 237. As shown in FIG. 3, the detection resistor 232 is connected in series between the other end of the electromagnet coil 151 and the drain terminal 411a of the transistor 411. The differential amplifier 237 amplifies an electric potential difference between the ends of the detection resistor 232 to detect a current flowing in the detection resistor 232. In this case, one end of the detection resistor 232 is connected to an input end on the minus side of the differential amplifier 237 through a resistor 233. The input end on the minus side of the differential amplifier 237 is connected to an output end of the differential amplifier 237 through a resistor 235. The other end of the detection resistor 232 is connected to an input end on the plus side of the differential amplifier 237 through a resistor 234. The input end on the plus side of the differential amplifier 237 is grounded through a resistor 236. The resistors 233 through 236 include parasitic resistors of wires and resistor elements provided specially for adjustment of the offset voltage of the differential amplifier 237. The resistance of the resistor 233 is matched to that of the resistor 234 and the resistance of the resistor 235 is matched to that of the resistor 236, so that the differential amplifier 237 has a low offset voltage.

The electromagnet current detecting circuit 231 may be connected to the one end of the electromagnet coil 151 instead of the other end of the electromagnet coil 151.

Stabilizing capacitors 423*a* and 423*b* are connected between the positive electrode 221*a* of the power source 221 and the common node R and between the negative electrode 221*b* and the common node R, respectively, in order to stabilize the voltage of the power source 221 and the common node R.

Similar to prior art, the section between the other end of the electromagnet coil 151 and the transistor 411 (hereinafter referred to as node S) constitutes a cable 170, which interconnects the control device 400 and the turbo molecular pump main body 300, since the electromagnet coil 151 is an element of the turbo molecular pump main body 300.

This embodiment is also similar to prior art in that, as the magnetic bearing control circuit 401 is provided for the respective electromagnets including the upper radial electromagnets 104 and the lower radial electromagnets 105, the amplifier circuit 410 structured as above is provided for each of those electromagnets, meaning that there are identical amplifier circuits (each of which is denoted by 410) for the lower radial electromagnets 105 and for the axial electromagnets 106A and 106B in addition to the amplifier circuit 410 for the upper radial electromagnets 104.

The pulse control circuit 407 determines pulse width time Tp1 and Tp2 of pulses to be generated within a control cycle Ts based on a current error signal outputted from the current error computing unit 205 in order to increase or decrease the electromagnet current iL. The pulse control circuit 407 then outputs gate drive signals having the pulse width time Tp1 or Tp2 to a gate terminal of the transistor 411, to thereby switch on or off the transistor 411.

The control device 400 in FIG. 1 has an intermediate-voltage maintaining circuit 451, which is provided for the common node R, in addition to the magnetic bearing control circuit 401 described above.

The intermediate-voltage maintaining circuit 451 has a command value setting circuit 453, which receives a setting signal for determining the electric potential (volt) of the common node R. Based on the setting signal inputted, the command value setting circuit 453 outputs a voltage value necessary for the common node R (hereinafter referred to as voltage command value) to a voltage error computing unit 455.

The voltage error computing unit 455 calculates an error between the voltage command value outputted from the command value setting circuit 453 and a voltage value of the common node R (hereinafter referred to as actual voltage value) (the error will hereinafter be referred to as voltage error value). The actual voltage value of the common node R is therefore sent to the voltage error computing unit 455 as it is. The voltage error value is outputted as a voltage error signal from the voltage error computing unit 455 to a regulator control circuit 457.

The regulator control circuit 457 is described along with a regulator circuit 460.

In FIG. 2, the common node R is connected to transistors 461 and 462 and diodes 465 and 466 through a choking coil 471 and through a regulator current detecting circuit 472 in the order stated (the connection node of the transistor 461 or the like will hereinafter be called as a node T).

The transistors 461 and 462 are N type power MOSFETs similar to the transistor 411. The transistor 461 has at one end a drain terminal 461*a* connected to the node T and has at the other end a source terminal 461*b* connected to the negative electrode 221*b* (the same electrode that is in the amplifier circuit 410). The transistor 462 has at one end a drain terminal 462*a* connected to the positive electrode 221*a* (the same electrode that is in the amplifier circuit 410) and has at the other end a source terminal 462*b* connected to the node T.

The diode 465 has a cathode terminal 465*a* connected to the node T and has an anode terminal 465*b* connected to the negative electrode 221*b*. The diode 466 has a cathode terminal 466*a* connected to the positive electrode 221*a* and has an anode terminal 466*b* connected to the node T.

The choking coil 471 is an element provided to avoid direct transmission of fluctuation of the node T which is caused by a rapid increase or decrease of a current from the transistors 461 and 462 (in other words, noise accompanying ripple current or the like generated from the regulator circuit 460) to the common node R.

The regulator current detecting circuit 472 connected to the node T detects a current flowing from the regulator circuit 460 to the common node R. With the regulator current detecting circuit 472 detecting a current flowing from the regulator circuit 460, the turbo molecular pump can be protected against total breakdown when breakage of the transistor 411, the diode 415, or others causes an increased current flow in the choking coil 471.

For satisfactory transfer of a voltage Vh of the positive electrode 221*a*, the voltage applied to a gate terminal of the transistor 462 is desirably equal to or larger than the voltage Vh. The voltage Vh is satisfactorily transferred by, for example, inputting a signal from a regulator drive signal of the regulator control circuit 457 to the gate terminal of the transistor 462 through a simple boost circuit.

The common node R, which connects the one end of the electromagnet coil 151 and the regulator circuit 460 to each other, constitutes the cable 170, which interconnects the control device 400 and the turbo molecular pump main body 300, since the regulator circuit 460 is a circuit of the control device 400.

The regulator control circuit 457 determines, in accordance with a voltage error signal outputted from the voltage error computing unit 455, how long the node T is to be connected to the positive electrode 221*a* or to the negative electrode 221*b* in order to keep the common node R at a given intermediate voltage Vc. When determining the time period, control by the regulator control circuit 457 is based solely on the voltage error signal outputted from the voltage error computing unit 455 and nothing else. The regulator control circuit 457 then outputs a regulator drive signal to a gate terminal of the transistor 461 and to the gate terminal of the transistor 462 to switch on or off the transistors 461 and 462.

The intermediate voltage Vc at which the regulator circuit 460 is kept is desirably half the sum of the voltage of the positive electrode 221*a* (the voltage Vh) and the voltage of the negative electrode 221*b* (a voltage Vl), namely, (Vh+Vl)/2.

Figure 4:
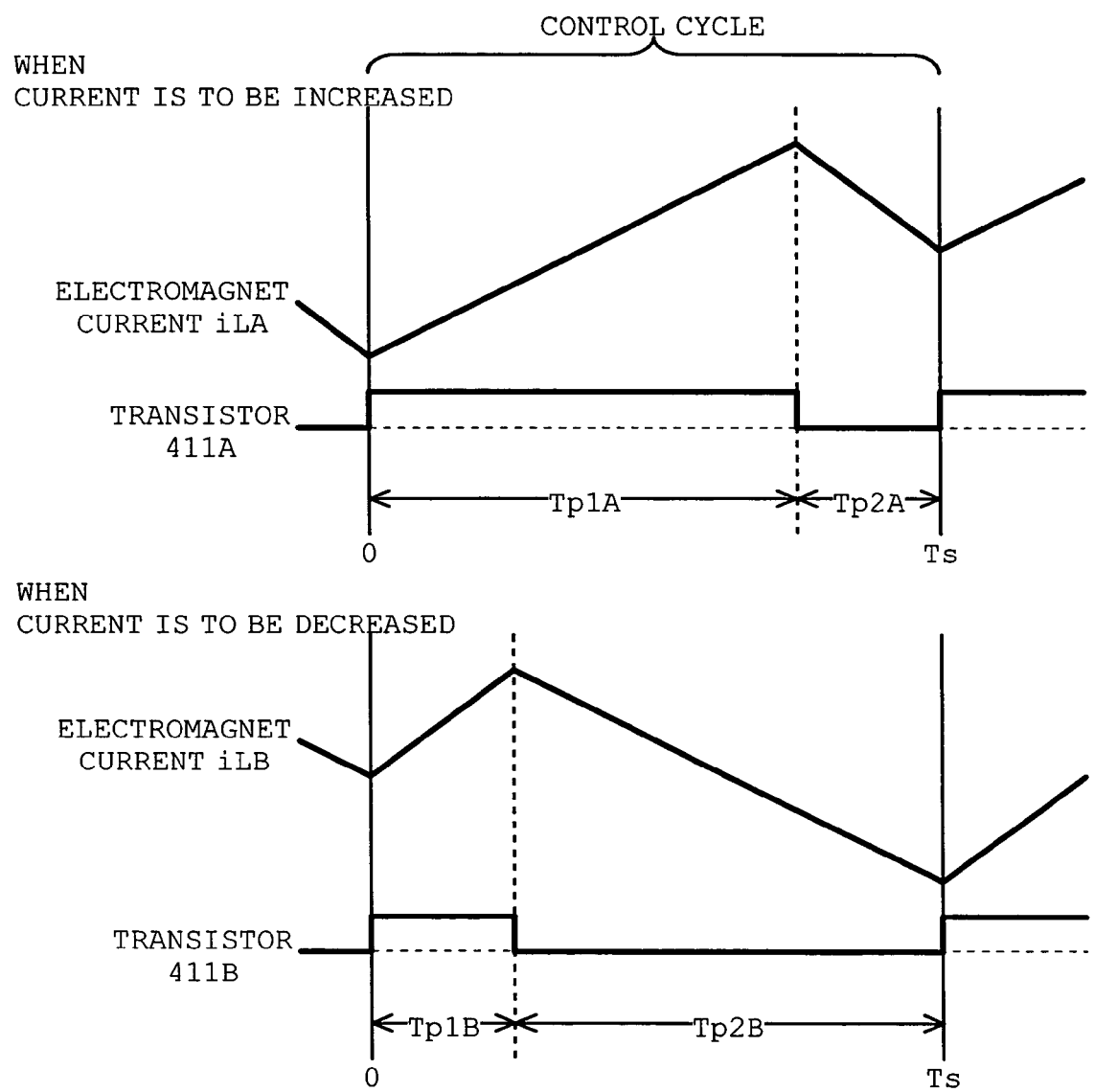
FIG. 4 is a time chart showing control of the amplifier circuit.

In this structure, when an electromagnet current iLA is to be increased in an amplifier circuit 410A provided for an electromagnet coil 151A (the suffix A is added in order to discriminate a particular electromagnet coil and its amplifier circuit from other electromagnet coils and their amplifier circuits. The same rule applies to the following description), a transistor 411A within one control cycle Ts, as shown in FIG. 4, is kept turned on for a time period corresponding to a pulse width time Tp1A and is kept turned off for a time period corresponding to a pulse width time Tp2A.

While the transistor 411A is kept turned on, the electromagnet current iL flowing from the common node R (which is assumed to maintain the intermediate voltage Vc) to the negative electrode 221*b* through the electromagnet coil 151 and the transistor 411A is supplied to the electromagnet coil 151. On the other hand, while the transistor 411A is kept turned off, the electromagnet current iL regenerated from the common node R to the positive electrode 221*a* in the amplifier circuit 410A through the electromagnet coil 151, the node S, and a diode 415A is supplied to the electromagnet coil 151.

Therefore, the electromagnet current iLA within one control cycle Ts is increased by setting the pulse width time Tp1A longer than the pulse width time Tp2A.

This is all reversed in the case where an electromagnet current iLB (the suffix B is added) is to be decreased in an amplifier circuit 410B provided for another electromagnet coil 151B. The electromagnet current iLB within one control cycle Ts is decreased by setting a pulse width time Tp2B longer than a pulse width time Tp1B.

In the case where the electromagnet current iL is increased or decreased within a certain control cycle Ts only in the amplifier circuits 410A and 410B, the regulator circuit 460 is controlled as follows:

A total electromagnet current iLtot, which is the sum of the electromagnet currents iLA and iLB flowing in the amplifier circuits 410A and 410B, makes the voltage of the common node R lower than the intermediate voltage Vc. The voltage value of the common node R is sent to the voltage error computing unit 455, which then outputs to the regulator control circuit 457 a voltage error signal that instructs the regulator control circuit 457 to raise the voltage of the common node R. Upon receiving the signal, the regulator control circuit 457 turns the transistor 462 connected to the positive electrode 221*a* on, thereby raising the voltage of the common node R. The transistor 461 is kept turned off during this period.

On the other hand, when the voltage of the common node R is equal to or larger than the intermediate voltage Vc, the transistor 462 is turned off.

The regulator circuit 460 is controlled in this manner irrespective of the number of the amplifier circuits 410.

An increase or decrease of the electromagnet current iL can thus be controlled through proper control of the total electromagnet current iLtot in the regulator circuit 460 even when the amplifier circuit 410 is composed of one transistor 411 and one diode 415.

With the elements that constitute the amplifier circuit 410 reduced in number, the control device 400 can be reduced in size. The control device 400 therefore does not take up much space when installed in a clean room or the like, and requires less cost to install.

Moreover, the control device 400 having fewer elements is less likely to malfunction and, furthermore, consumes less power and generates less heat.

In addition, the only wire that connects the amplifier circuit 410 and the other end of the electromagnet coil 151 to each other is the node S, there are only ten wires that serve as the node S in the case of a 5-axis control magnetic bearing. Wiring of the common node R too involves only one wire that extends from the turbo molecular pump main body 300 to the regulator circuit 460, which makes the total number of wires that interconnect the control device 400 and the electromagnets eleven.

Therefore, the cost of the cable 170 can be lowered.

With the number of wires that constitute the cable 170 reduced, the cable 170 can be reduced in diameter and accordingly, a connector serving as an entrance and an exit of the turbo molecular pump main body 300 can be reduced in size. As a result, the cost of the connector can be lowered.

Furthermore, the downsized control device 400 makes it possible to incorporate the functions of the control device 400 in the turbo molecular pump main body 300 with ease. This means that the control device 400 and the turbo molecular pump main body 300 can be integrated into one eliminating the need for the cable 170 and the connector which interconnect the control device 400 and the turbo molecular pump main body 300. Therefore, less cost is required to manufacture and install the turbo molecular pump.

Although the transistor 462 of the regulator circuit 460 is an N type power MOSFET in this embodiment, the present invention is not limited thereto. The transistor 462 may be a P type power MOSFET. In this case, there is no need to provide the transistor 462 with a boost circuit or the like that drives the gate terminal of the transistor 462. The phase of a gate drive signal inputted to the P type power MOSFET serving as the transistor 462 is opposite to the gate drive signal phase of when an N type power MOSFET is employed for the transistor 462.

In this embodiment, the regulator control circuit 457 controls the regulator circuit 460 based solely on a voltage error signal outputted from the voltage error computing unit 455 and nothing else (in other words, the transistors 461 and 462 are turned on or off in accordance with the result of comparison between the voltage of the common node R and the intermediate voltage Vc alone). However, the present invention is not limited there to and the regulator circuit 460 may be controlled by PWM control at a given cycle.

In this case, the regulator control circuit 457 of the intermediate-voltage maintaining circuit 451 in FIG. 1 receives a carrier wave (not shown in the drawing) having a given cycle Tr (hereinafter referred to as control cycle Tr). The regulator control circuit 457 controls the pulse width of a regulator drive signal outputted to the transistors 461 and 462 within one control cycle Tr by PWM control.

FIG. 5 is a time chart showing control of the regulator circuit for when the voltage of the common node R is to be raised in this structure. In FIG. 5, the positive direction of a current supplied from the regulator circuit (hereinafter referred to as regulator current iR) is from the node T to the common node R.

The transistors 461 and 462 of the regulator circuit 460 in FIG. 5 are turned on once for a given period of time within one control cycle Tr. The transistors 461 and 462 are controlled so as not to be turned on or off at the same time.

While the transistor 462 alone is kept turned on, the node T is connected to the positive electrode 221*a* and a current flows from the positive electrode 221*a* to the common node R through the node T and the choking coil 471, thereby increasing the regulator current iR. While the transistor 461 alone is kept turned on, the node T is connected to the negative electrode 221*b* and a current flows from the common node R to the negative electrode 221*b* through the choking coil 471 and the node T, thereby decreasing the regulator current iR.

When the actual voltage value of the common node R is considerably lower than the voltage command value, meaning that the voltage error is large, the time period in which the transistor 462 is kept turned on within one control cycle Tr is set longer than the time period in which the transistor 461 is kept turned on within the control cycle Tr in accordance with the voltage error. This makes the time period in which the regulator current iR is increased within the one control cycle Tr longer than the period in which the regulator current iR is decreased within the control cycle Tr. As a result, the regulator current iR averaged over several control cycles (Tr) is increased for each additional control cycle Tr, thereby raising the voltage of the common node R. The reason why the transistor 461 on the side of the negative electrode 221b is turned on in the control cycle Tr despite the operation for raising the voltage of the common node R is that too rapid a raise in voltage of the common node R makes the gain of a feedback loop composed of the regulator circuit 460 and the regulator control circuit 457 too large, which could induce oscillation of the system.

On the other hand, when the actual voltage value of the common node R is slightly lower than the voltage command value, meaning that the voltage error is small, the time period in which the transistor 462 is kept turned on within one control cycle Tr is set equivalent to the time period in which the transistor 461 is kept turned on within the control cycle Tr in accordance with the voltage error. This makes the regulator current iR averaged over several control cycles (Tr) substantially zero, causing the voltage of the common node R to converge toward the intermediate voltage Vc.

Although the regulator current iR averaged over several control cycles (Tr) is substantially zero in this case, there are an increase and decrease of the regulator current iR in each control cycle Tr since one of the transistors 461 and 462 is always turned on during each control cycle Tr.

In this way, the voltage of the common node R can be maintained at the intermediate voltage Vc also by performing PWM control over the regulator circuit 460.

Described next is Embodiment 2 of the present invention.

A control device according to Embodiment 2 is a modification of the control device 400 of Embodiment 1 and gives the amplifier circuit 410 a different structure. Therefore, a magnetic bearing control circuit and intermediate-voltage maintaining circuit in this embodiment are identical to the magnetic bearing control circuit 401 and intermediate-voltage maintaining circuit 451 of Embodiment 1 except amplifier circuits.

Figure 6:
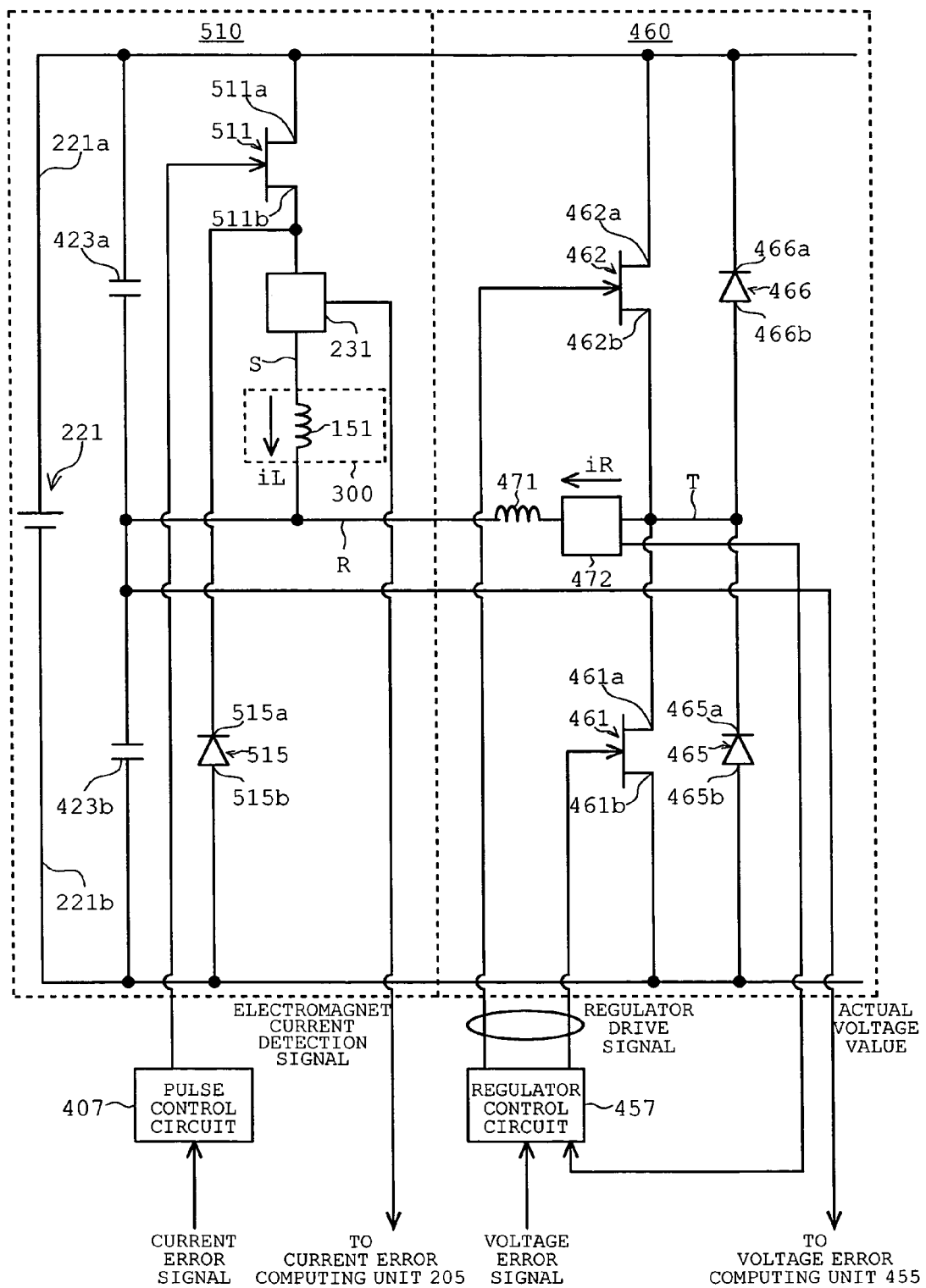
FIG. 6 is a circuit diagram of an amplifier circuit according to Embodiment 2 of the present invention.

A circuit diagram of an amplifier circuit according to Embodiment 2 of the present invention is shown in FIG. 6. Components in FIG. 6 that are identical to those in FIGS. 2 and 16 are denoted by the same reference symbols and descriptions thereof are omitted here.

In FIG. 6, one end of the electromagnet coil 151 is connected to the common node R as in Embodiment 1. The other end of the electromagnet coil 151 is connected to a positive electrode 221a of a power source 221 through an electromagnet current detecting circuit 231 and through a transistor 511 as in Embodiment 1.

Similar to prior art, the transistor 511 is a so-called N type power MOSFET. The transistor 511 has at one end a drain terminal 511a connected to the positive electrode 221a and has at the other end a source terminal 511b connected to the electromagnet current detecting circuit 231.

A diode 515 for current regeneration has a cathode terminal 515a connected to the source terminal 511b of the transistor 511 and has an anode terminal 515b connected to a negative electrode 221b.

Similar to the transistor 462, the voltage applied to a gate terminal of the transistor 511 is desirably equal to or larger than a voltage Vh of the positive electrode 221a for satisfactory transfer of the voltage Vh. The voltage Vh is satisfactorily transferred by, for example, inputting a signal from the pulse control circuit 407 to the gate terminal of the transistor 511 through a simple boost circuit.

In addition, the amplifier circuit 510 structured as above is provided for each of the lower radial electromagnets 105 and for the axial electromagnets 106A and 106B as in Embodiment 1.

In this structure, when the electromagnet current iL is to be increased in the amplifier circuit 510, the transistor 511 within one control cycle Ts is kept turned on for a time period corresponding to the pulse width time Tp1 and is kept turned off for a time period corresponding to the pulse width time Tp2.

While the transistor 511 is kept turned on, the electromagnet current iL flowing from the positive electrode 221a to the common node R through the transistor 511 and the electromagnet coil 151 is supplied to the electromagnet coil 151. On the other hand, while a transistor 511 is kept turned off, the electromagnet coil 151 is supplied with the electromagnet current iL that is regenerated from the negative electrode 221b in the amplifier circuit 510 to the common node R through the diode 515, the node S, and the electromagnet coil 151.

Therefore, the electromagnet current iL within one control cycle Ts is increased by setting the pulse width time Tp1 longer than the pulse width time Tp2.

This is all reversed in the case where the electromagnet current iL is to be decreased in the amplifier circuit 510. The electromagnet current iL within one control cycle Ts is decreased by setting the pulse width time Tp2 longer than the pulse width time Tp1.

The regulator circuit 460 of this embodiment which employs the amplifier circuit 510 controls the common node R in a manner mostly identical to Embodiment 1. However, unlike the amplifier circuit 410, the amplifier circuit 510 affects the common node R to raise the electric potential of the common node R.

A total electromagnet current iLtot, which is the sum of electromagnet currents iLA and iLB flowing in amplifier circuits 510A and 510B, makes the voltage of the common node R higher than the intermediate voltage Vc. The voltage value of the common node R is sent to the voltage error computing unit 455, which then outputs to the regulator control circuit 457 a voltage error signal that instructs the regulator control circuit 457 to drop the voltage of the common node R. Upon receiving the signal, the regulator control circuit 457 turns the transistor 461 connected to the negative electrode 221b on, thereby dropping the voltage of the common node R. The transistor 462 is kept turned off during this period.

On the other hand, when the voltage of the common node R is equal to or lower than the intermediate voltage Vc, the transistor 461 is turned off.

The regulator circuit 460 is controlled in this manner irrespective of the number of the amplifier circuits 510.

The above-described control may be replaced by PWM control over the regulator circuit 460 as has been discussed in Embodiment 1 with reference to FIG. 5. In this case also, a carrier wave having the control cycle Tr as one cycle is inputted to the regulator control circuit 457 of the intermediate-voltage maintaining circuit 451.

FIG. 7 is a time chart showing control of the regulator circuit for when the voltage of the common node R is to be dropped (see FIG. 5 for control for when the voltage of the common node R is to be raised).

As in FIG. 5, the transistors 461 and 462 of the regulator circuit 460 in FIG. 7 are turned on once for a given period of time within one control cycle Tr.

When the actual voltage value of the common node R is considerably higher than the voltage command value, meaning that the voltage error is large, the time period in which the transistor 461 is kept turned on within one control cycle Tr is set longer than the time period in which the transistor 462 is kept turned on within the control cycle Tr. This decreases the regulator current iR averaged over several control cycles (Tr) for each additional control cycle Tr, thereby dropping the voltage of the common node R.

On the other hand, when the actual voltage value of the common node R is slightly higher than the voltage command value, meaning that the voltage error is small, the time period in which the transistor 462 is kept turned on within one control cycle is set equivalent to the time period in which the transistor 461 is kept turned on within the control cycle Tr. This makes the regulator current iR averaged over several control cycles (Tr) substantially zero, causing the voltage of the common node R to converge toward the intermediate voltage Vc.

The regulator circuit 460 thus maintains the voltage of the common node R by detecting the voltage. The regulator circuit 460 can therefore be controlled in the same manner irrespective of the load structure, whether the load is the amplifier circuit 410 (FIG. 2) of Embodiment 1 or the amplifier circuit 510 (FIG. 6) of this embodiment. This enables Embodiment 2 to employ the same regulator circuit 460 that is used in Embodiment 1.

This embodiment can increase or decrease the electromagnet current iL only with one transistor 511 and one diode 515 as does Embodiment 1, despite the amplifier circuit 510 being structured as shown in FIG. 6, differently from the amplifier circuit 410. Therefore, a circuit structure that is easy to design can be chosen in designing an amplifier circuit and a circuit that is easy to control can be chosen in controlling the amplifier circuit.

Although the transistor 511 of the amplifier circuit 510 is an N type power MOSFET in this embodiment, the present invention is not limited thereto. The transistor 511 may be a P type power MOSFET similar to the transistor 462. In this case, there is no need to provide the transistor 511 with a boost circuit or the like that drives the gate terminal of the transistor 511. The phase of a gate drive signal inputted to the P type power MOSFET serving as the transistor 511 is opposite to the gate drive signal phase of when an N type power MOSFET is employed for the transistor 511.

Described next is Embodiment 3 of the present invention.

A control device according to Embodiment 3 is a modification of the control device 400 of Embodiment 1 or the control device of Embodiment 2 and gives the amplifier circuit 410 or 510 a different structure. Therefore, a magnetic bearing control circuit and intermediate-voltage maintaining circuit in this Embodiment are identical to the magnetic bearing control circuit 401 and intermediate-voltage maintaining circuit 451 of Embodiment 1, or the magnetic bearing control circuit and intermediate-voltage maintaining circuit of Embodiment 2, except amplifier circuits.

Figure 8:
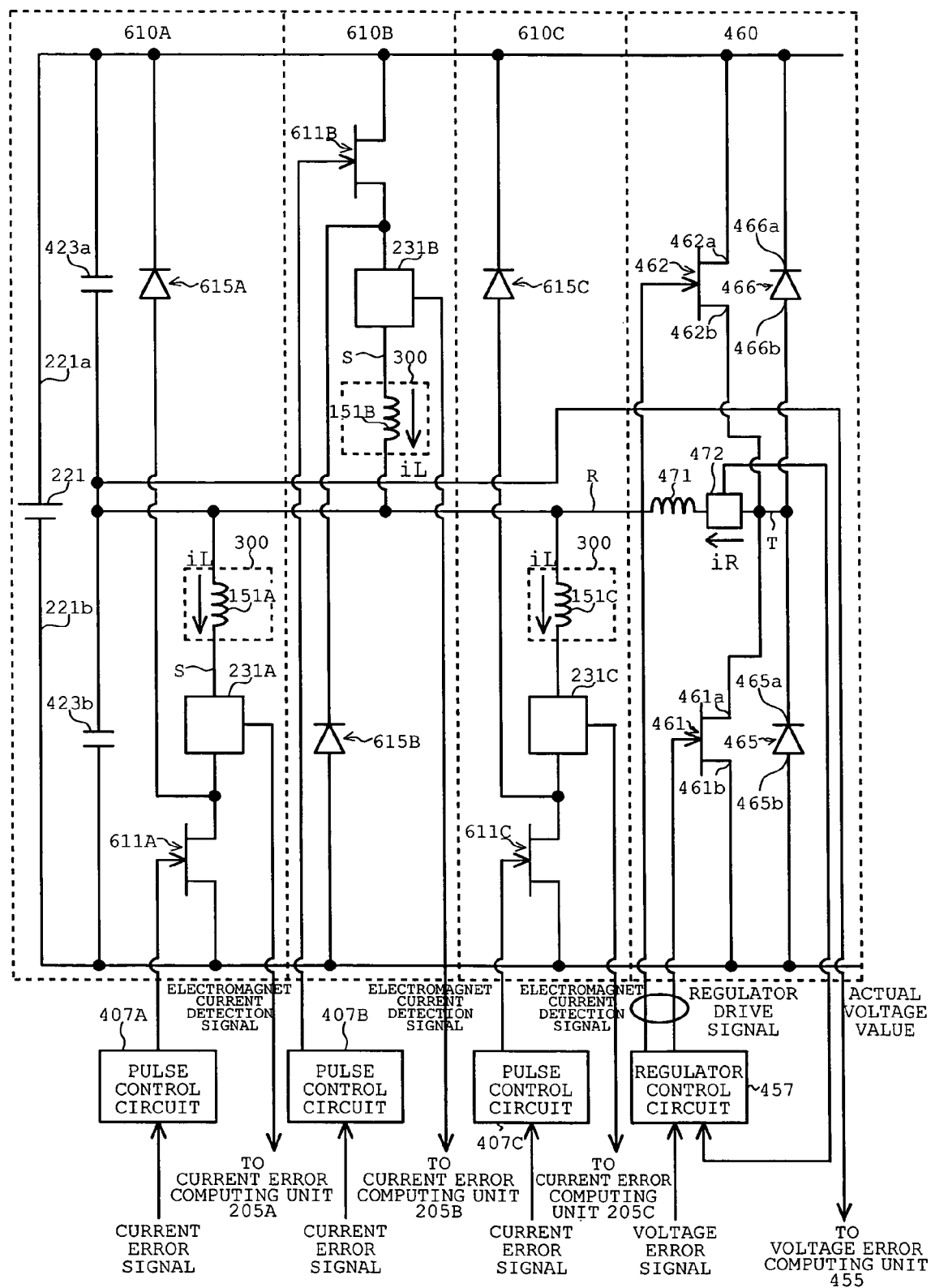
FIG. 8 is a circuit diagram of an amplifier circuit according to Embodiment 3 of the present invention.

A circuit diagram of amplifier circuits according to Embodiment 3 of the present invention is shown in FIG. 8. Components in FIG. 8 that are identical to those in FIGS. 1, 2, and 16 are denoted by the same reference symbols and descriptions thereof are omitted here. FIG. 8 also shows electromagnet coils 151A, 151B, 151C . . . (hereinafter, amplifier circuits and other components provided for the electromagnet coils 151A, 151B, 151C . . . are denoted by reference symbols with the suffixes A, B, C . . . ) which constitute the upper radial electromagnets 104, the lower radial electromagnets 105, and other electromagnets.

In FIG. 8, an amplifier circuit 610A provided for the electromagnet coil 151A has a transistor 611A and a diode 615A, which are identical in structure to the transistor 411 and the diode 415 of Embodiment 1. The transistor 611A and the diode 615A are connected in the same way the transistor 411 and the diode 415 are connected in the amplifier circuit 410.

In contrast to the amplifier circuit 610A, an amplifier circuit 610B provided for the electromagnet coil 151B which is different from the electromagnet coil 151A has a transistor 611B and a diode 615B, which are identical in structure to the transistor 511 and the diode 515 of Embodiment 2. The transistor 611B and the diode 615B are connected in the same way the transistor 511 and the diode 515 are connected in the amplifier circuit 510.

An amplifier circuit 610C provided for the electromagnet coil 151C which is different from the electromagnet coils 151A and 151B is similar to the amplifier circuit 610A and is structured as described in Embodiment 1.

In this embodiment, the amplifier circuits 610A, 610B, 610C . . . provided for different electromagnets are thus divided into two groups: one having the same structure as Embodiment 1 (the amplifier circuit 410) and the other having the same structure as Embodiment 2 (the amplifier circuit 510).

In order to give a specific example of how the amplifier circuits are divided into groups, a description is given on the relation between the electromagnets 104X+ and 104X− in the upper radial electromagnets 104 and the electromagnets 105X+ and 105X− in the lower radial electromagnets 105.

For instance, to control the position of the entire rotor 103 in the + direction of the X axis, the electromagnet current iL flowing in the electromagnets 104X+ and 105X+ is increased whereas the electromagnet current iL flowing in the electromagnets 104X− and 105X− is decreased. On the other hand, to control the position of the entire rotor 103 in the − direction of the X axis, the electromagnet current iL flowing in the electromagnets 104X+ and 105X+ is decreased whereas the electromagnet current iL flowing in the electromagnets 104X− and 105X− is increased.

As described, it is often that the upper radial electromagnets 104 and the lower radial electromagnets 105 are almost similarly controlled in the X axis direction for positional control of the rotor 103. An increase in electromagnet current iL flowing in the upper radial electromagnets 104 (the electromagnet 104X+, for example) therefore tends to cause an increase in electromagnet current iL flowing in the lower radial electromagnets 105 (electromagnet 105X+). Accordingly, if the electromagnets 104X+ and 104X− are put in one group whereas the electromagnets 105X+ and 105X− are put in another group, a current flows from the positive electrode 221a to the common node R in the lower radial electromagnets 105 when a current flows from the common node R to the negative electrode 221b in the upper radial electromagnets 104. Thus, the total electromagnet current iLtot necessary to keep the common node R at the intermediate voltage Vc can be decreased.

This applies also to the relation between the rest of the upper radial electromagnets 104 and the rest of the lower radial electromagnets 105, and it is therefore desirable to put the upper radial electromagnets 104Y+ and 104Y− in one group whereas the lower radial electromagnets 105Y+ and 105Y− in another group.

As to the relation between the electromagnet 104X+ and electromagnet 104X− of the upper radial electromagnets 104, for example, the electromagnet current iL flowing in the electromagnet 104X+ tends to increase while the electromagnet current iL flowing in the electromagnet 104X− decreases to control the position of the rotor 103 in the + direction along the X axis. The electromagnets 104X+ and 104X− are therefore desirably put in the same group. This applies to the rest of the electromagnets which are desirably divided into groups as follows: the electromagnets 104Y+ and 104Y−; the electromagnets 105X+ and 105X− of the lower radial electromagnets; the electromagnets 105Y+ and 105Y− of the lower radial electromagnets; and the axial electromagnets 106A and 106B.

In this structure, the amplifier circuit 610A and other amplifier circuits having the structure of Embodiment 1 control the electromagnet current iL in the same way as in Embodiment 1, and the amplifier circuit 610B and other amplifier circuits having the structure of Embodiment 2 control the electromagnet current iL in the same way as in Embodiment 2.

The regulator circuit 460 maintains the voltage of the common node R by detecting the voltage as in Embodiment 1 and Embodiment 2. Therefore, basically, the regulator circuit 460 is controlled in the same way as in Embodiments 1 and 2. The difference from Embodiments 1 and 2 is that the transistors 461 and 462 are turned on or off almost at the same time so that the group of the amplifier circuits including the amplifier circuit 610A work to drop the voltage of the common node R whereas the group of the amplifier circuits including the amplifier circuit 610B work to raise the voltage of the common node R.

This embodiment is also similar to Embodiments 1 and 2 in that the regulator circuit 460 can be controlled by PWM control except that the operation of raising the voltage of the common node R (FIG. 5) and the operation of dropping the voltage of the common node R (FIG. 7) are carried out appropriately.

Thus, the effects of Embodiments 1 and 2 can be obtained also when the employed amplifier circuit structure is different from those in Embodiments 1 and 2.

Furthermore, dividing electromagnets into groups appropriately makes it possible to decrease the total electromagnet current iLtot necessary to keep the common node R at the intermediate voltage Vc. Therefore, the transistors 461 and 462 that constitute the regulator circuit 460 can be downsized and accordingly the control device can further be reduced in size.

Described next is Embodiment 4 of the present invention.

The electromagnet current detecting circuit 231 used in Embodiment 1 (FIG. 2) is not directly connected to the negative electrode 221b (in other words, near the common node R), and receives high voltage (about the level of the intermediate voltage Vc) upon turning off of the transistor 411 and other circumstances in the amplifier circuit 410 of Embodiment 1. For that reason, in some cases, the electromagnet current detecting circuit 231 having the differential amplifier 237 as shown in FIG. 3 magnifies the offset voltage and allows noise to overlap, thereby making it difficult to detect the electromagnet current iL with high precision. This necessitates the use of a highly precise differential amplifier or a non-contact type hole sensor serving as a current sensor for accurate detection of the electromagnet current iL, and the cost of parts is increased in some cases.

An amplifier circuit of Embodiment 4 solves this problem by changing the structure of the electromagnet current detecting circuit 231 that is used in the amplifier circuit of Embodiment 1 such that one end of the electromagnet current detecting circuit 231 is connected to the negative electrode 221b.

Figure 9:
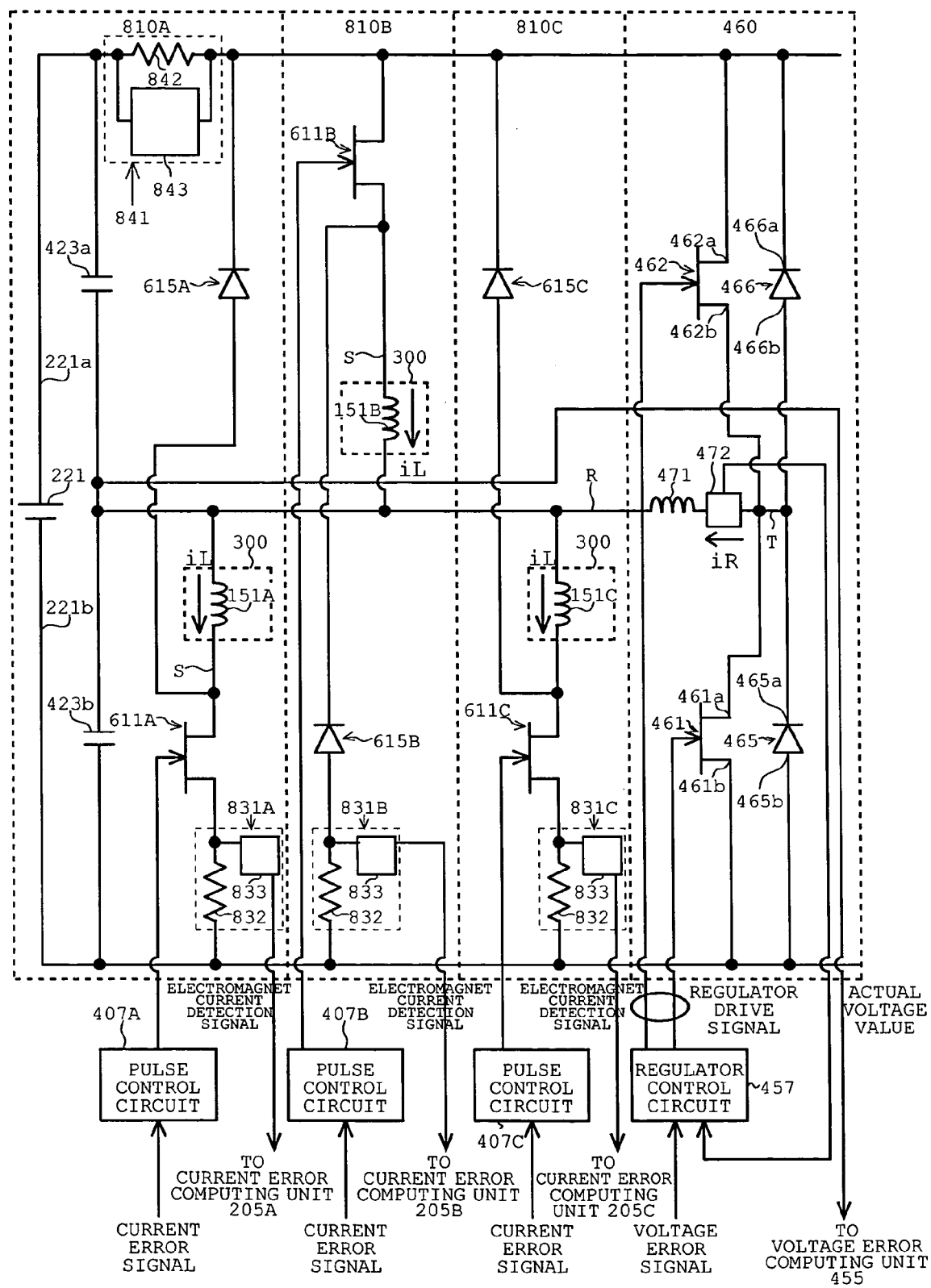
FIG. 9 is a circuit diagram of an amplifier circuit according to Embodiment 4 of the present invention.

A circuit diagram of the amplifier circuit according to Embodiment 4 is shown in FIG. 9. The description of this embodiment is based on the structure of Embodiment 3 (FIG. 8), but it could be based on the structures of Embodiments 1 and 2 (FIG. 2 and FIG. 6) instead.

In FIG. 9, where amplifier circuits 810A and 810C are structured as described in Embodiment 1, the electromagnet current detecting circuit 231A connected in series between the electromagnet coil 151A and the transistor 611A in FIG. 8 is replaced by an electromagnet current detecting circuit 831A connected in series between the transistor 611A and the negative electrode 221b, while the electromagnet current detecting circuit 231C connected in series between the electromagnet coil 151C and the transistor 611C in FIG. 8 is replaced by an electromagnet current detecting circuit 831C connected in series between the transistor 611C and the negative electrode 221b.

An amplifier circuit 810B, on the other hand, is structured as described in Embodiment 2, but has an electromagnet current detecting circuit 831B connected in series between the diode 615B and the negative electrode 221b instead of the electromagnet current detecting circuit 231B connected in series between the electromagnet coil 151B and the transistor 611B in FIG. 8.

Each of the electromagnet current detecting circuits 831A, 831B, and 831C has a detection resistor 832 which is connected at one end to the negative electrode 221b and at the other end to the transistor 611A, the diode 615B, or the transistor 611C. Each detection resistor 832 is provided, at the other end, with a detector 833 for detecting the electromagnet current iL from the voltage of the detection resistor 832 by flowing a current in the detection resistor 832. The detector 833 outputs an electromagnet current detection signal.

A portion of the positive electrode 221a of the power source 221 that is near the stabilizing capacitor 423a is provided with a power source protecting circuit 841 which is composed of a detection resistor 842 connected in series to a power source line of the positive electrode 221a, and a detector 843 for detecting an electric potential difference between the ends of the detection resistor 842. The power source protecting circuit 841 prevents an excessive current from flowing into the amplifier circuit 810A and others.

In this structure, the electromagnet current iL in the amplifier circuits 810A and 810C flows from the common node R to the negative electrode 221b when the transistors 611A and 611C are turned on as in Embodiment 1. When the transistors 611A and 611C are turned off, the electromagnet current iL in the amplifier circuits 810A and 810C flows from the common node R to the positive electrode 221a. A current therefore flows in the electromagnet current detecting circuits 831A and 831C when the transistors 611A and 611C are turned on, and the electromagnet current iL is detected at this point. In the amplifier circuit 810B, the electromagnet current iL flows from the positive electrode 221a to the common node R when the transistor 611B is turned on as in Embodiment 2. When the transistor 611B is turned off, the electromagnet current iL in the amplifier circuit 810B flows from the negative electrode 221b to the common node R. A regenerated current therefore flows in the electromagnet current detecting circuit 831B when the transistor 611B is turned off, and the electromagnet current iL is detected at this point. The relations described above are shown in FIG. 10.

The relations shown in FIG. 10 indicate that the direction of the electromagnet current iL detected by the electromagnet current detecting circuits 831A and 831C and the direction of the electromagnet current iL detected by the electromagnet current detecting circuit 831B are opposite to each other.

In this embodiment, the time period during which each electromagnet current detecting circuit 831A, 831B, and 831C can detect the electromagnet current iL amounts to merely half the control cycle Ts. However, there is no need for the electromagnet current detecting circuits to detect the electromagnet current iL constantly since once in the control cycle Ts is enough for correct control.

Thus the electromagnet current detecting circuits 831A, 831B, and 831C, which are structured differently from Embodiment 1 and other embodiments, too are capable of detecting the electromagnet current iL and the amplifier circuits 810A, 810B, and 810C are controlled based on the detection results.

The electromagnet current detecting circuits 831A, 831B, and 831C of this embodiment each have the detection resistor 832, which is connected at one end to the negative electrode 221b and whose voltage of the other end is inputted to the detector 833, and therefore constant input of high voltage to the detector 833 is avoided unlike the electromagnet current detecting circuit 231 of Embodiment 1 to which high voltage is inputted upon turning off of the transistor 411 and other circumstances, making it difficult to detect the electromagnet current iL with high precision in some cases. Since this prevents the detector 833 from developing an offset voltage, noise is avoided and accurate detection of the electromagnet current iL is made possible. With the need to use a highly precise differential amplifier and an expensive hole sensor serving as a current sensor thus eliminated, the electromagnet current detecting circuit 831 can have a simple structure and parts cost can be lowered.

Described next is Embodiment 5 of the present invention.

A control device according to Embodiment 5 is a modification of the control device of Embodiment 1 or other embodiments, and controls the regulator circuit 460 in a different manner.

Figure 11:
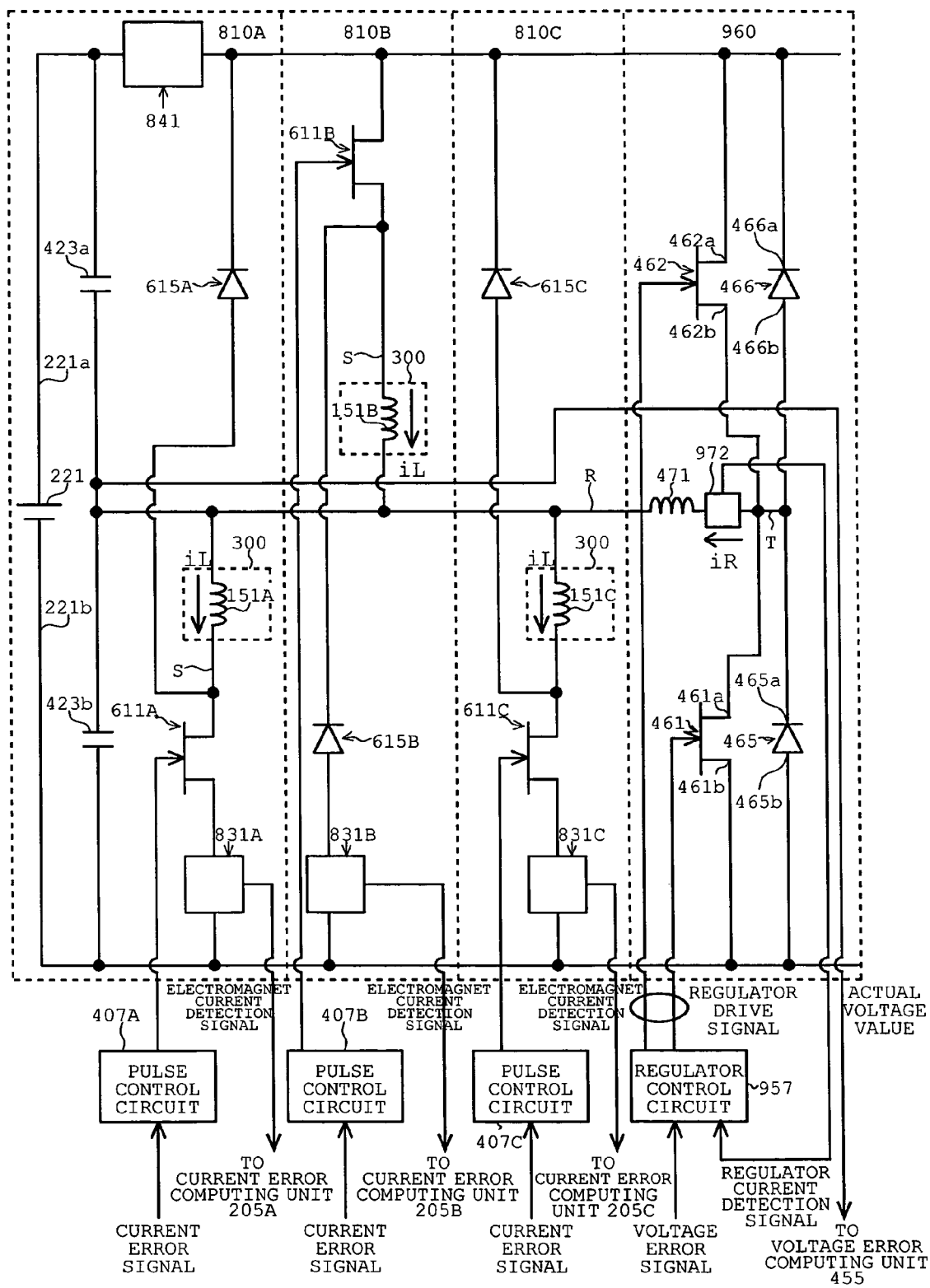
FIG. 11 is a circuit diagram of an amplifier circuit according to Embodiment 5 of the present invention.
Figure 14:
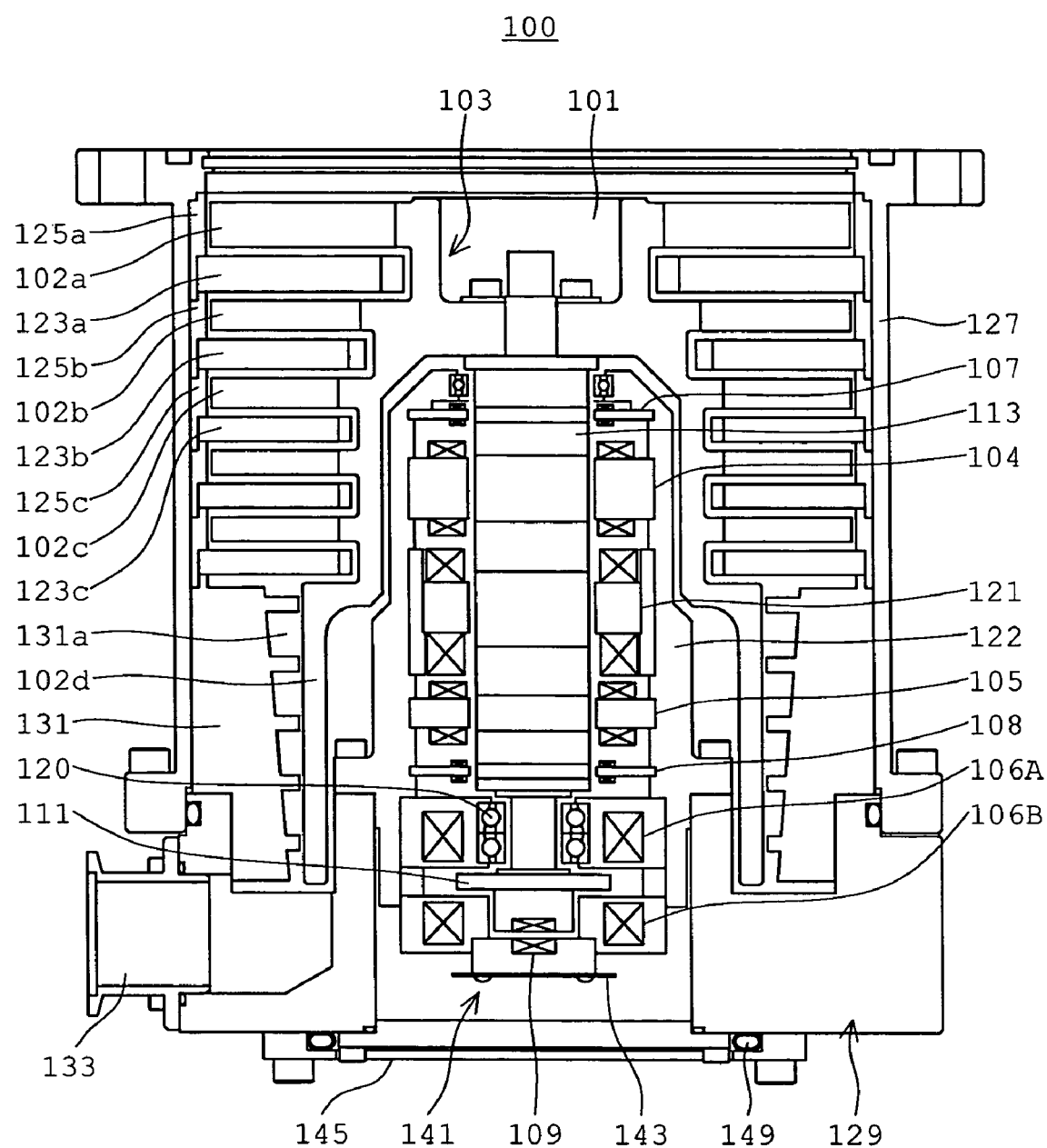
FIG. 14 is a vertical sectional view of a turbo molecular pump main body.

A circuit diagram of an amplifier circuit according to Embodiment 5 is shown in FIG. 11. The description of this embodiment is based on the structure of Embodiment 4 (FIG. 9), but it could be based on the structures of Embodiments 1, 2, and 3 (FIG. 2, FIG. 6, and FIG. 8) instead. This embodiment deals with as an example a case of performing PWM control on a regulator circuit as shown in FIGS. 5 and 7.

In FIG. 11, a regulator circuit 960 has a regulator current detecting circuit 972 between the node T and the choking coil 471. The regulator current detecting circuit 972 has the function of the regulator current detecting circuit 472 according to Embodiment 1 or other embodiments, namely, the function of protecting the turbo molecular pump. Another function of the regulator current detecting circuit 972 is to output a regulator current detection signal, which indicates the value of the regulator current iR detected by the regulator current detecting circuit 972, to a regulator control circuit 957.

The regulator control circuit 957 also receives an error between the actual voltage value of the common node R and the voltage command value (a voltage error signal) which is calculated and sent by the voltage error computing unit 455 shown in FIG. 1. Based on the regulator current iR value and the voltage error, the regulator control circuit 957 performs current mode control.

The current mode control according to this embodiment refers to control exerted by the regulator control circuit 957 in which a limit iRL of the regulator current iR supplied from the regulator circuit 960 (the positive side limit is denoted by +iRL and the negative side limit is denoted by −iRL) is changed in accordance with the error between the voltage command value for the common node R and the actual voltage value of the common node R and, if the regulator current iR exceeds the limit iRL, output of a regulator drive signal to the transistors 461 and 462 is stopped. The regulator control circuit 957 sets the limit iRL high when the error between the voltage command value and the actual voltage value is large and, when the voltage error is small, sets the limit iRL of the regulator current iR low.

FIG. 12 is a time chart showing how the regulator circuit is controlled to raise the voltage of the common node R by the current mode control in this structure.

In FIG. 12, the transistor 462 connected to the positive electrode 221a in the regulator circuit 960 is turned on once for a given period of time within one control cycle Tr. In contrast to the transistor 462, the transistor 461 connected to the negative electrode 221b is kept turned off during the control cycle Tr.

While the transistor 462 is kept turned on, the node T is connected to the positive electrode 221a and the regulator current iR is increased. When the transistor 462 is turned off to join the transistor 461 which has been kept turned off, a regenerated current flows from the negative electrode 221b to the common node R through the diode 465 and therefore the regulator current iR is decreased.

In this embodiment, the regulator current iR is decreased by using a regenerated current flowing through the diode 465 instead of turning the transistor 461 on as described in FIG. 5. The regulator current iR in this embodiment can be decreased at the same level as in FIG. 5, regardless of the differences in the way of control. This is made possible by equivalently adjusting the forward resistance of the diode 465 and the on resistance of the transistor 461, thus the amount of the regulator current iR flowing in the diode 465 can be equivalent to the amount of the regulator current iR flowing in the transistor 461.

In this regulator circuit 960, when the actual voltage value of the common node R is considerably lower than the voltage command value, meaning that the voltage error is large, the time period in which the transistor 462 is kept turned on within one control cycle Tr is set longer than half the control cycle Tr in accordance with the voltage error. This makes the time period in which the regulator current iR is increased within the one control cycle Tr longer than the period in which the regulator current iR is decreased within the control cycle Tr. As a result, the regulator current iR averaged over several control cycles (Tr) is increased for each additional control cycle Tr, thereby raising the voltage of the common node R.

In this case, since the error between the voltage command value and the actual voltage value is large, the regulator control circuit 957 sets the limit +iRL of the regulator current iR sufficiently high according to the current mode control. With the limit +iRL set high in this way, it is not often that the regulator current iR supplied from the regulator circuit 960 actually exceeds the limit +iRL and the limit +iRL does not influence control of the regulator circuit 960.

Thus the time chart in this case is substantially identical to FIG. 5.

On the other hand, when the actual voltage value of the common node R is slightly lower than the voltage command value, meaning that the voltage error is small, the transistor 462 is kept turned on only for a brief period (in other words, the duty of a pulse outputted to the transistor 462 is small). When the error between the voltage command value and the actual voltage value is small, the regulator control circuit 957 sets the limit +iRL of the regulator current iR low according to the current mode control. The transistor 462 is immediately turned off if the regulator current controlling circuit 957 judges that the regulator current iR detected by the regulator current detecting circuit 972 exceeds the limit +iRL.

Since the regulator current iR increases only for a brief period during which the transistor 462 is kept turned on, the voltage of the common node R is raised only slightly at a time.

Although, in this embodiment, the regulator current iR is decreased when the transistor 462 is turned off and the regenerated current flows through the diode 465, the regulator current iR is prevented from being a negative current since the transistor 461 is not turned on.

FIG. 13 is a time chart showing how the regulator circuit is controlled to drop the voltage of the common node R by the current mode control.

In FIG. 13, the transistor 461 connected to the negative electrode 221*b* in the regulator circuit 960 is turned on once for a given period of time within one control cycle Tr. If the period during which the transistor 461 is kept turned on is half the control cycle Tr or less, the transistor 461 is turned on after the first half of the control cycle Tr has elapsed. If the period during which the transistor 461 is kept turned on is longer than half the control cycle Tr, the transistor 461 is turned on at some point in the first half of the control cycle Tr. In contrast to the transistor 461, the transistor 462 connected to the positive electrode 221*a* is kept turned off during the control cycle Tr.

While the transistor 461 is kept turned on, the node T is connected to the negative electrode 221*b* and the regulator current iR is decreased. When the transistor 461 is turned off, a regenerated current flows through the diode 466 and therefore the regulator current iR is increased.

By setting the period in which the transistor 461 is kept turned on within one control cycle Tr longer than half the control cycle Tr when the actual voltage value of the common node R is considerably higher than the voltage command value and the voltage error is large, the regulator current iR averaged over several control cycles (Tr) is decreased for each additional control cycle Tr, thereby dropping the voltage of the common node R.

In this case, since the error between the voltage command value and the actual voltage value is large, the absolute value of the limit –iRL of the regulator current iR is set sufficiently high according to the current mode control. The limit –iRL set high does not influence control of the regulator circuit 960, and thus the time chart in this case is substantially identical to FIG. 7.

On the other hand, when the actual voltage value of the common node R is slightly higher than the voltage command value, meaning that the voltage error is small, the transistor 461 is kept turned on only for a brief period. This is because, as described above, the regulator control circuit 957 sets the limit –iRL of the regulator current iR low according to the current mode control and the transistor 461 is turned off promptly.

Since the regulator current iR decreases only for a brief period during which the transistor 461 is kept turned on, the voltage of the common node R is dropped only slightly at a time and converges toward the intermediate voltage Vc.

Although the regulator current iR is increased when the transistor 461 is turned off and the regenerated current flows through the diode 466, the regulator current iR is prevented from being a positive current since the transistor 462 is not turned on in this embodiment.

Thus the voltage of the common node R can be maintained at the intermediate voltage Vc through current mode control by raising and dropping the voltage of the common node R appropriately based on the regulator current iR value and the voltage error.

In the current control mode according to this embodiment, the limit iRL of the regulator current iR is set high when the error between the voltage command value and the actual voltage value is large, so that there is little fear of the limit iRL influencing control of the regulator circuit 960.

When the error between the voltage command value and the actual voltage value is small, in FIGS. 5 and 7, one of the transistors 461 and 462 is always turned on during one control cycle Tr within which occurred is a large increase or decrease in regulator current iR, which although exhibits only a slight increase or decrease when averaged over several control cycles (Tr). On the other hand, in this embodiment, the current mode control sets the limit iRL of the regulator current iR low and the duty of an output pulse of a regulator drive signal is reduced to prevent the regulator current iR from exceeding the limit iRL. Furthermore, the regulator current iR does not become a negative current when the voltage of the common node R is raised and, when the voltage of the common node R is dropped, the regulator current iR does not become a positive current. This makes it possible to reduce ripples of the regulator current iR when the error between the voltage command value and the actual voltage value is small.

The current flowing in the transistors 461 and 462, the choking coil 471, and the stabilizing capacitors 423*a* and 423*b* can thus be reduced and less heat is generated from these elements, which makes it possible to prolong the life time of the device. Consequently, parts cost is lowered and the reliability of the turbo molecular pump can be improved overall.

In addition, ripples of the voltage of the common node R can be reduced, which makes it possible to reduce the volume of the stabilizing capacitors 423*a* and 423*b*. Thus, the control device can be downsized and the cost of installing the control device can be lowered.

As has been described, according to the present invention, the elements that constitute the amplifier circuit for driving, through excitation, the electromagnets can be reduced in number by using the first supply current flowing from the second positive electrode to the negative electrode and the first regenerated current regenerated from the second positive electrode to the first positive electrode for exciting and controlling the electromagnets and by using the second voltage generating/maintaining means to keep the second positive electrode at the second voltage.

In addition, since the electromagnets form at one end a common node and the common node is kept at the second voltage, the number of wires of the cable that interconnect the each electromagnet and the amplifier circuit is reduced to lower the cost of manufacturing and installing the turbo molecular pump.

Furthermore, with the electromagnet current detecting means detecting a current supply to the electromagnets by using a resistor that is connected at one end to the negative electrode, the current can be detected with high precision while avoiding input of high voltage to the electromagnet current detecting means. The electromagnet current detecting means can therefore have a simple structure and parts cost can be lowered.

Moreover, since the current flowing between the regulator circuit and the one end of the each electromagnet is controlled and prevented from exceeding a limit, ripples of the current flowing between the regulator circuit and the one end of the each electromagnet can be reduced by setting the limit appropriately.

What is claimed is:

1. A magnetic bearing device comprising:
    a rotor;
    position control means for controlling at least one of a radial position and an axial position of the rotor by electromagnets;
    first voltage generating means for generating a first voltage between a first positive electrode and a negative electrode;
    second voltage generating/maintaining means for generating a second voltage, which is lower than the first voltage, between a second positive electrode and the negative electrode and maintaining the second voltage, the first and second positive electrodes being different from each other; and
    first excitation control means for exciting and controlling the electromagnets by one of a first supply current supplied from the second positive electrode to the negative electrode and a first regenerated current regenerated from the second positive electrode to the first positive electrode,
    wherein the first excitation control means includes:
        a first switch element for connecting and disconnecting the first supply current;
        a first control circuit for controlling connection and disconnection of the first switch element; and
        a first rectifier element for causing the first regenerated current to flow in the direction of its regeneration.

2. A magnetic bearing device according to claim 1, further comprising:
    a resistor connected at one end to the negative electrode; and
    electromagnet current detecting means for detecting the value of one of currents supplied to and regenerated by the electromagnets by flowing the current in the resistor.

3. A magnetic bearing device according to claim 1, wherein the first control circuit performs cyclic control through PWM control based on a current flowing in the electromagnets.

4. A magnetic bearing device according to claim 1, wherein the second voltage is half the first voltage.

5. A magnetic bearing device according to claim 1,
    wherein the plural electromagnets are provided, and
    wherein the each electromagnet forms at one end a common node, which is kept at the second voltage by the second voltage generating/maintaining means.

6. A magnetic bearing device according to claim 5, wherein the second voltage generating/maintaining means includes:
    a voltage error computing unit for calculating an error between the voltage of the one end of the each electromagnet and a voltage command value; and
    a regulator circuit for adjusting the second voltage in accordance with the error calculated by the voltage error computing unit.

7. A magnetic bearing device according to claim 6, wherein the regulator circuit performs cyclic control through PWM control based on the error.

8. A magnetic bearing device according to claim 5,
    wherein the second voltage generating/maintaining means has a regulator circuit for adjusting the second voltage, and
    wherein a current flow is controlled so that a current flowing between the regulator circuit and the one end of the each electromagnet does not exceed a given limit.

9. A magnetic bearing device according to claim 8, wherein, in the current flow control, a regenerated current flows between the regulator circuit and the one end of the each electromagnet.

10. A magnetic bearing device according to claim 8, wherein the limit is changed in accordance with an error between the voltage of the one end of the each electromagnet and the voltage command value.

11. A magnetic bearing device according to claim 8,
    wherein the regulator circuit includes:
        a choking coil connected to the one end of the each electromagnet;
        a third switch element for connecting and disconnecting a current that flows between the choking coil and the negative electrode;
        a third rectifier element for causing a current to flow from the negative electrode to the choking coil;
        a fourth switch element for connecting and disconnecting a current that flows between the first positive electrode and the choking coil; and
        a fourth rectifier element for causing a current to flow from the choking coil to the first positive electrode,
    wherein, to raise the voltage of the one end of the each electromagnet, the third switch element is kept disconnected while controlling connection and disconnection of the fourth switch element, and
    wherein, to drop the voltage of the one end of the each electromagnet, the fourth switch element is kept disconnected while controlling connection and disconnection of the third switch element.

12. A magnetic bearing device according to claim 10, wherein the limit is changed to a larger value as the error increases.

13. A magnetic bearing device comprising:
    a rotor;
    position control means for controlling at least one of a radial position and an axial position of the rotor by electromagnets;
    first voltage generating means for generating a first voltage between a first positive electrode and a negative electrode;
    second voltage generating/maintaining means for generating a second voltage, which is lower than the first voltage, between a second positive electrode and the negative electrode and maintaining the second voltage, the first and second positive electrodes being different from each other; and
    second excitation control means for exciting and controlling the electromagnets by one of a second supply current supplied from the first positive electrode to the second positive electrode and a second regenerated current regenerated from the negative electrode to the second positive electrode,
    wherein the second excitation control means includes:
        a second switch element for connecting and disconnecting the second supply current;
        a second control circuit for controlling connection and disconnection of the second switch element; and
        a second rectifier element for causing the second regenerated current to flow in the direction of its regeneration.

14. A magnetic bearing device according to claim 13, further comprising:

a resistor connected at one end to the negative electrode; and electromagnet current detecting means for detecting the value of one of currents supplied to and regenerated by the electromagnets by flowing the current in the resistor.

15. A magnetic bearing device according to claim 13, wherein the second control circuit performs cyclic control through PWM control based on a current flowing in the electromagnets.

16. A magnetic bearing device according to claim 13, wherein the second voltage is half the first voltage.

17. A magnetic bearing device according to claim 13, wherein the plural electromagnets are provided, and
wherein the each electromagnet forms at one end a common node, which is kept at the second voltage by the second voltage generating/maintaining means.

18. A magnetic bearing device according to claim 17, wherein the second voltage generating/maintaining means includes:
a voltage error computing unit for calculating an error between the voltage of the one end of the each electromagnet and a voltage command value; and
a regulator circuit for adjusting the second voltage in accordance with the error calculated by the voltage error computing unit.

19. A magnetic bearing device according to claim 18, wherein the regulator circuit performs cyclic control through PWM control based on the error.

20. A magnetic bearing device according to claim 17,
wherein the second voltage generating/maintaining means has a regulator circuit for adjusting the second voltage, and
wherein a current flow is controlled so that a current flowing between the regulator circuit and the one end of the each electromagnet does not exceed a given limit.

21. A magnetic bearing device according to claim 20, wherein, in the current flow control, a regenerated current flows between the regulator circuit and the one end of the each electromagnet.

22. A magnetic bearing device according to claim 20, wherein the limit is changed in accordance with an error between the voltage of the one end of the each electromagnet and the voltage command value.

23. A magnetic bearing device according to claim 20,
wherein the regulator circuit includes:
a choking coil connected to the one end of the each electromagnet;
a third switch element for connecting and disconnecting a current that flows between the choking coil and the negative electrode;
a third rectifier element for causing a current to flow from the negative electrode to the choking coil;
a fourth switch element for connecting and disconnecting a current that flows between the first positive electrode and the choking coil; and
a fourth rectifier element for causing a current to flow from the choking coil to the first positive electrode,
wherein, to raise the voltage of the one end of the each electromagnet, the third switch element is kept disconnected while controlling connection and disconnection of the fourth switch element, and
wherein, to drop the voltage of the one end of the each electromagnet, the fourth switch element is kept disconnected while controlling connection and disconnection of the third switch element.

24. A magnetic bearing device according to claim 22, wherein the limit is changed to a larger value as the error increases.

25. A magnetic bearing device comprising:
a rotor;
position control means for controlling at least one of a radial position and an axial position of the rotor by a plurality of electromagnets;
first voltage generating means for generating a first voltage between a first positive electrode and a negative electrode;
second voltage generating/maintaining means for generating a second voltage, which is lower than the first voltage, between a second positive electrode and the negative electrode and maintaining the second voltage, the first and second positive electrodes being different from each other;
first excitation control means for exciting and controlling at least one of the plural electromagnets by one of a first supply current supplied from the second positive electrode to the negative electrode and a first regenerated current regenerated from the second positive electrode to the first positive electrode; and
second excitation control means for exciting and controlling at least one of the electromagnets, excluding the one or more that are excited and controlled by the first excitation control means, by one of a second supply current supplied from the first positive electrode to the second positive electrode and a second regenerated current regenerated from the negative electrode to the second positive electrode,
wherein the first excitation control means includes:
a first switch element for connecting and disconnecting the first supply current;
a first control circuit for controlling connection and disconnection of the first switch element; and
a first rectifier element for causing the first regenerated current to flow in the direction of its regeneration, and
wherein the second excitation control means includes:
a second switch element for connecting and disconnecting the second supply current;
a second control circuit for controlling connection and disconnection of the second switch element; and
a second rectifier element for causing the second regenerated current to flow in the direction of its regeneration.

26. A magnetic bearing device according to claim 25, wherein the electromagnets are divided into two groups, one excited and controlled by the first excitation control means and the other excited and controlled by the second excitation control means, so that the amount of current flowing from the first positive electrode to the second positive electrode and the amount of current flowing from the second positive electrode to the negative electrode are made equivalent to each other.

27. A magnetic bearing device according to claim 25, further comprising:
a first resistor connected at one end to the negative electrode and at the other end to the first switch element;
first electromagnet current detecting means for detecting the value of a current supplied to the electromagnets by flowing the current in the first resistor;
a second resistor connected at one end to the negative electrode and at the other end to the second rectifier element; and second electromagnet current detecting means for detecting the value of a current regenerated by the electromagnets by flowing the current in the second resistor, wherein the first electromagnet current detecting means makes a detection when the first switch element is connected, and wherein the second electromagnet current detecting means makes a detection when the second switch element is disconnected.

28. A magnetic bearing device according to claim 26, wherein the position control means includes:
   a first radial positive side electromagnet for controlling the rotor from the radial positive side at a given position in the axial direction of the rotor;
   a first radial negative side electromagnet that forms a pair with the first radial positive side electromagnet to control the rotor from the radial negative side;
   a second radial positive side electromagnet for controlling the rotor from the radial positive side at a position apart from the first radial positive side electromagnet and the first radial negative side electromagnet; and
   a second radial negative side electromagnet that forms a pair with the second radial positive side electromagnet to control the rotor from the radial negative side, and
wherein the first radial positive side electromagnet and the second radial positive side electromagnet are put in different groups, and the first radial negative side electromagnet and the second radial negative side electromagnet are put in different groups.

29. A magnetic bearing device according to claim 26, wherein the position control means includes:
   a radial, X-axis, positive-side electromagnet and a radial, Y-axis, positive-side electromagnet for controlling the rotor from the radial, X-axis positive side and from the radial, Y-axis positive side at given positions in the axial direction of the rotor; and
   a radial, X-axis, negative-side electromagnet and a radial, Y-axis, negative-side electromagnet that are respectively paired with the radial, X-axis, positive-side electromagnet and the radial, Y-axis, positive-side electromagnet to control the rotor from the radial, X-axis negative side and from the radial, Y-axis negative side, and
   wherein the radial, X-axis, positive-side electromagnet and the radial, X-axis, negative-side electromagnet constitute one group while the radial, Y-axis, positive-side electromagnet and the radial, Y-axis, negative-side electromagnet constitute another group.

30. A magnetic bearing device according to claim 26, wherein the position control means includes:
   an axial positive side electromagnet for controlling the rotor from the axial positive side; and
   an axial negative side electromagnet that forms a pair with the axial positive side electromagnet to control the rotor from the axial negative side, and
   wherein the axial positive side electromagnet and the axial negative side electromagnet are put in the same group.

31. A turbo molecular pump comprising the magnetic bearing device according to claim 1,
   wherein the rotor has rotor blades and a rotor shaft placed at the center of the rotor blades, and
   wherein the position control means levitates the rotor shaft by a magnetic force.

32. A turbo molecular pump comprising the magnetic bearing device according to claim 13,
   wherein the rotor has rotor blades and a rotor shaft placed at the center of the rotor blades, and
   wherein the position control means levitates the rotor shaft by a magnetic force.

33. A turbo molecular pump according to claim 31, further comprising:
   a turbo molecular pump main body having at least the rotor and the position control means; and
   a control device having at least the first excitation control means,
   wherein the turbo molecular pump main body and the control device are integrated into one.

34. A turbo molecular pump according to claim 32, further comprising:
   a turbo molecular pump main body having at least the rotor and the position control means; and
   a control device having at least the second excitation control means,
   wherein the turbo molecular pump main body and the control device are integrated into one.

* * * * *